US006231077B1

United States Patent
Karolek et al.

(10) Patent No.: US 6,231,077 B1
(45) Date of Patent: *May 15, 2001

(54) DYNAMIC CONTROL VALVE SYSTEM ADAPTED FOR INFLATABLE RESTRAINT SYSTEMS FOR VEHICLES

(75) Inventors: Neil C. Karolek, New Berlin, WI (US); Oded E. Sturman, Woodland Park, CO (US); Derek A. Dahlgren, Wauwatosa, WI (US)

(73) Assignee: Sturman/TLX LLC, Woodland Park, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/579,408

(22) Filed: May 25, 2000

Related U.S. Application Data

(63) Continuation of application No. 09/048,373, filed on Mar. 26, 1998, now Pat. No. 6,068,288.

(51) Int. Cl.[7] ................................................ B60R 21/26
(52) U.S. Cl. ......................... 280/735; 280/737; 280/742
(58) Field of Search .................................. 280/735, 736, 280/737, 742; 251/129.1, 129.15; 137/625.34

(56) References Cited

U.S. PATENT DOCUMENTS

| | | |
|---|---|---|
| 2,676,779 | 4/1954 | Boden et al. . |
| 3,095,901 | 7/1963 | Larson et al. . |
| 3,661,299 | 5/1972 | Durstewitz . |
| 3,683,239 | 8/1972 | Sturman . |
| 3,743,898 | 7/1973 | Sturman . |
| 3,788,596 | 1/1974 | Maeda . |
| 3,910,314 | 10/1975 | Nicholson . |
| 3,980,270 | 9/1976 | Thomas . |
| 4,203,616 | 5/1980 | Okada . |

(List continued on next page.)

OTHER PUBLICATIONS

Diesel Progress, "Developments in Digital Valve Technology" by Rob Wilson; Apr. 1997.
Diesel Progress "Vickers Taking Closer Aim At Mobile Markets" by Mike Brezonick; Aug. 1997.
Machine Design "Breakthrough in Digital Valves"; Penton Publication; Feb. 21, 1994.
Industrial Management & Technology "The Swing to Cleaner, Smarter Hydraulics" by Stuart Brown; Jun. 6, 1997.

(List continued on next page.)

Primary Examiner—Lanna Mai
Assistant Examiner—Andrew J. Fischer
(74) Attorney, Agent, or Firm—Reinhart, Boerner, Van Deuren, Norris & Rieselbach, s.c.

(57) ABSTRACT

A dynamic control valve system adapted for inflatable restraint systems for vehicles includes a control valve having an inlet in fluid communication with a source of pressurized fluid, and an outlet in fluid communication with an inlet of the air bag. The control valve includes a valve member actuatable between a flow preventing position and a position spaced away from the flow preventing position. The control valve supplies the high pressure fluid through the control valve to the inflatable restraint for inflating the inflatable restraint when the valve member is moved away from its flow preventing position. The control valve includes a valve spool which cooperates with a valve casing to define a plurality of flow paths. Consequently, the actuation of the valve member between closed and open positions is substantially independent of forces produced by flow of the high pressure fluid through the valve. In one embodiment, the valve member, when unactuated, is maintained in its first position without mechanical bias. In another embodiment, the control valve includes a bias structure for biasing the valve member toward its closed position. In one embodiment, the valve member is moved between the first and second positions based upon at least one vehicle parameter or occupant parameter. Such parameters may be selected from, for example, vehicle deceleration, vehicle acceleration, and/or the presence, weight and/or position of an occupant of the vehicle.

17 Claims, 22 Drawing Sheets

U.S. PATENT DOCUMENTS

| | | |
|---|---|---|
| 4,275,901 | 6/1981 | Okada . |
| 4,289,327 | 9/1981 | Okada . |
| 4,332,368 | 6/1982 | Woloszczuk . |
| 4,409,638 | 10/1983 | Sturman et al. . |
| 4,771,914 | 9/1988 | Kaneda et al. . |
| 4,844,559 | 7/1989 | Harrison . |
| 4,857,842 | 8/1989 | Sturman et al. . |
| 5,133,386 | 7/1992 | Magee . |
| 5,161,776 | 11/1992 | Nicholson . |
| 5,226,668 | 7/1993 | Delonge-Immik et al. . |
| 5,573,269 | 11/1996 | Gentry et al. . |
| 5,598,871 | 2/1997 | Sturman et al. . |
| 5,639,117 | 6/1997 | Mandzy et al. . |
| 5,640,987 | 6/1997 | Sturman . |
| 5,641,148 | 6/1997 | Pena . |
| 5,711,347 | 1/1998 | Sturman et al. . |
| 5,713,316 | 2/1998 | Sturman . |
| 5,720,261 | 2/1998 | Sturman et al. . |

OTHER PUBLICATIONS

Supplemental Restraint System "What You Need To Know About Airbags"; brochure Information Brochure from NHTSA "Air Bags & On–Off Switches–Information for an Informed Decision".

Information from Department of Transportation NHTSA 49 CFR Parts 571 and 595 "Air Bag On–Off Switches".

Final Report by the National Conference on Medical Indications for Air Bag Disconnection by the Ronald Reagan Institute of Emergency Medicine and The National Crash Analysis Center; Jul. 16–18, 1997.

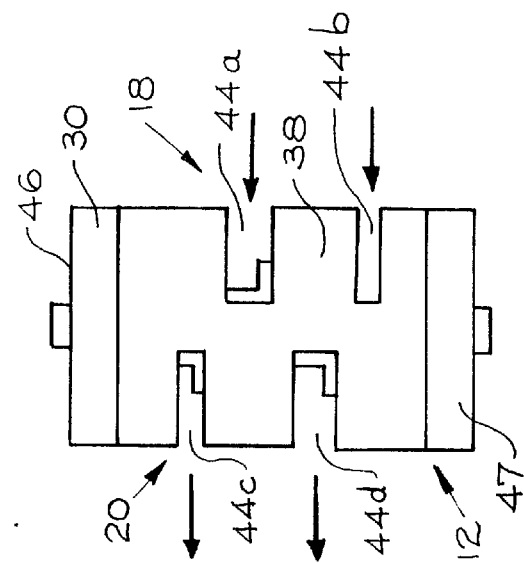
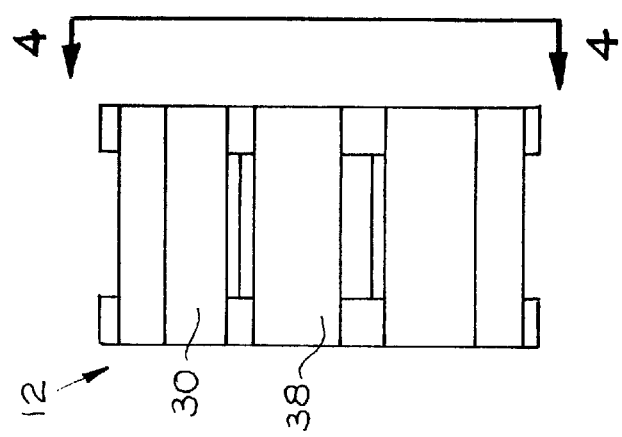
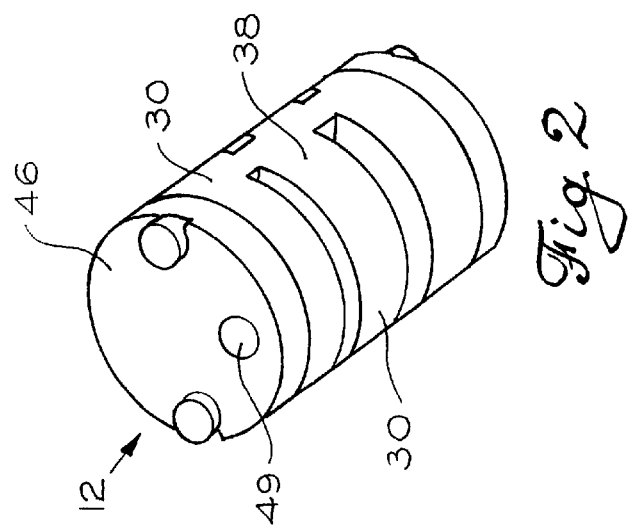

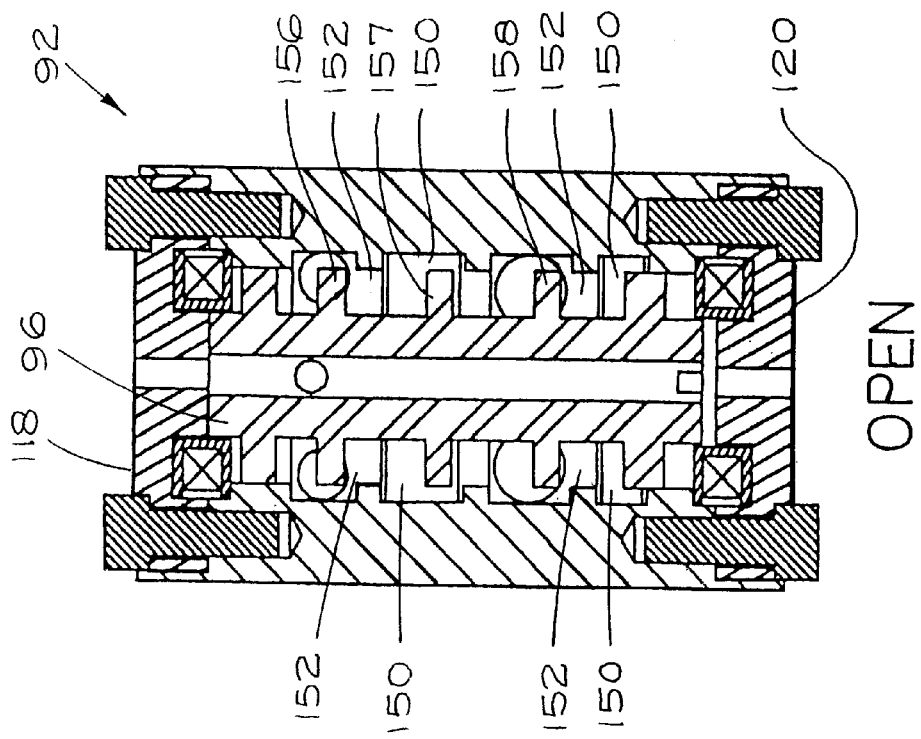
Fig. 13 OPEN
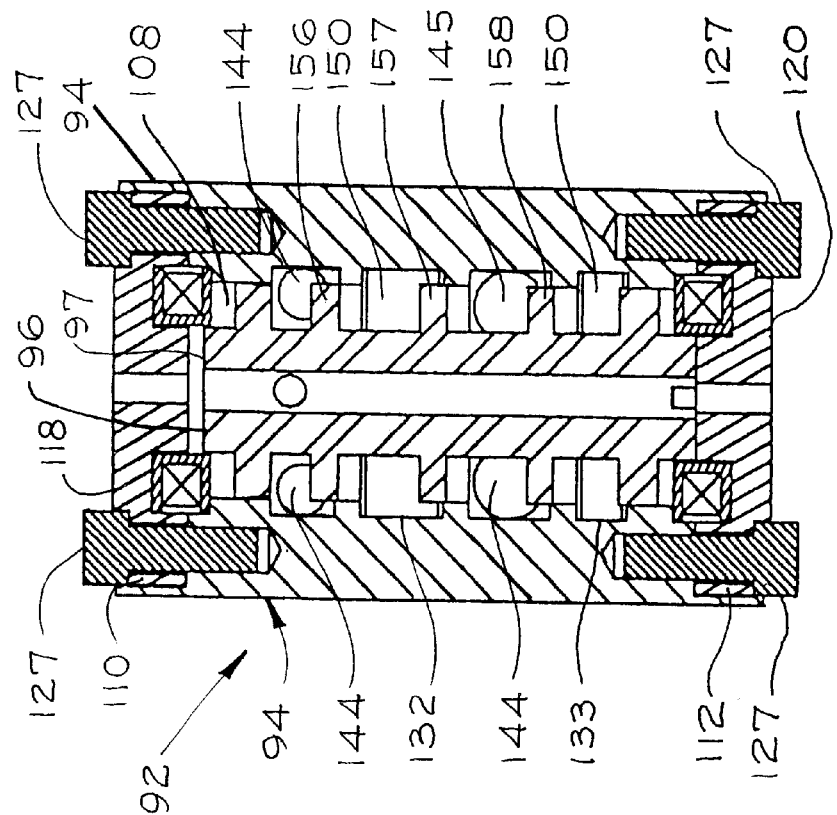
Fig. 12 CLOSED

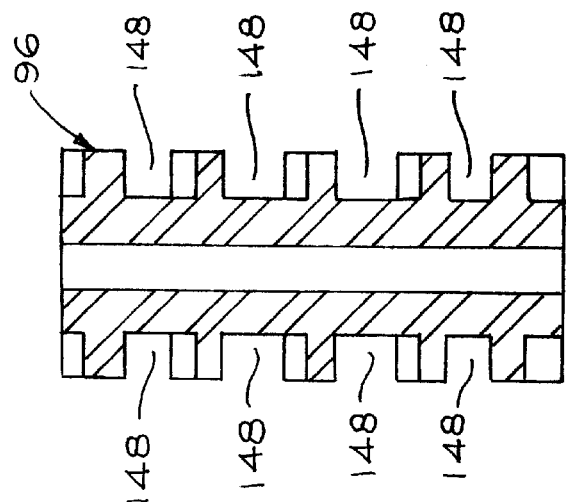
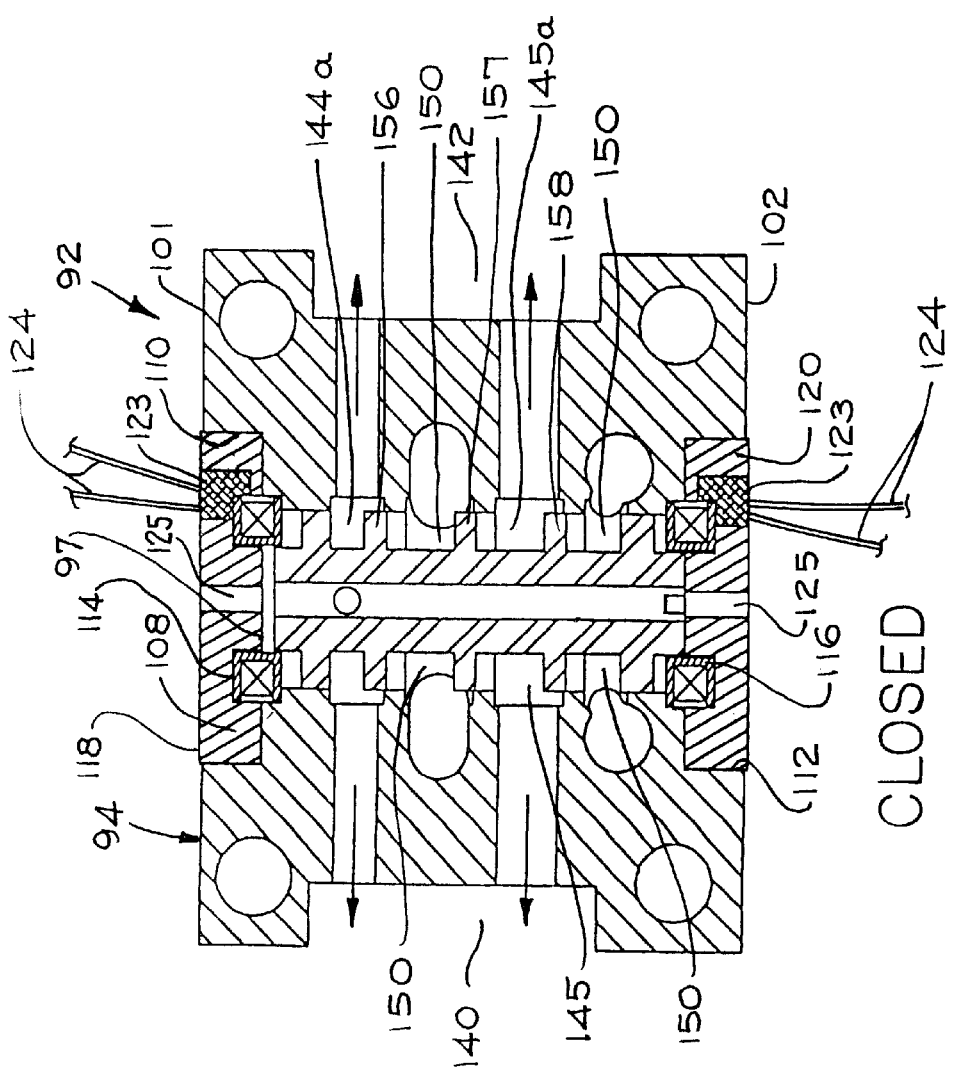

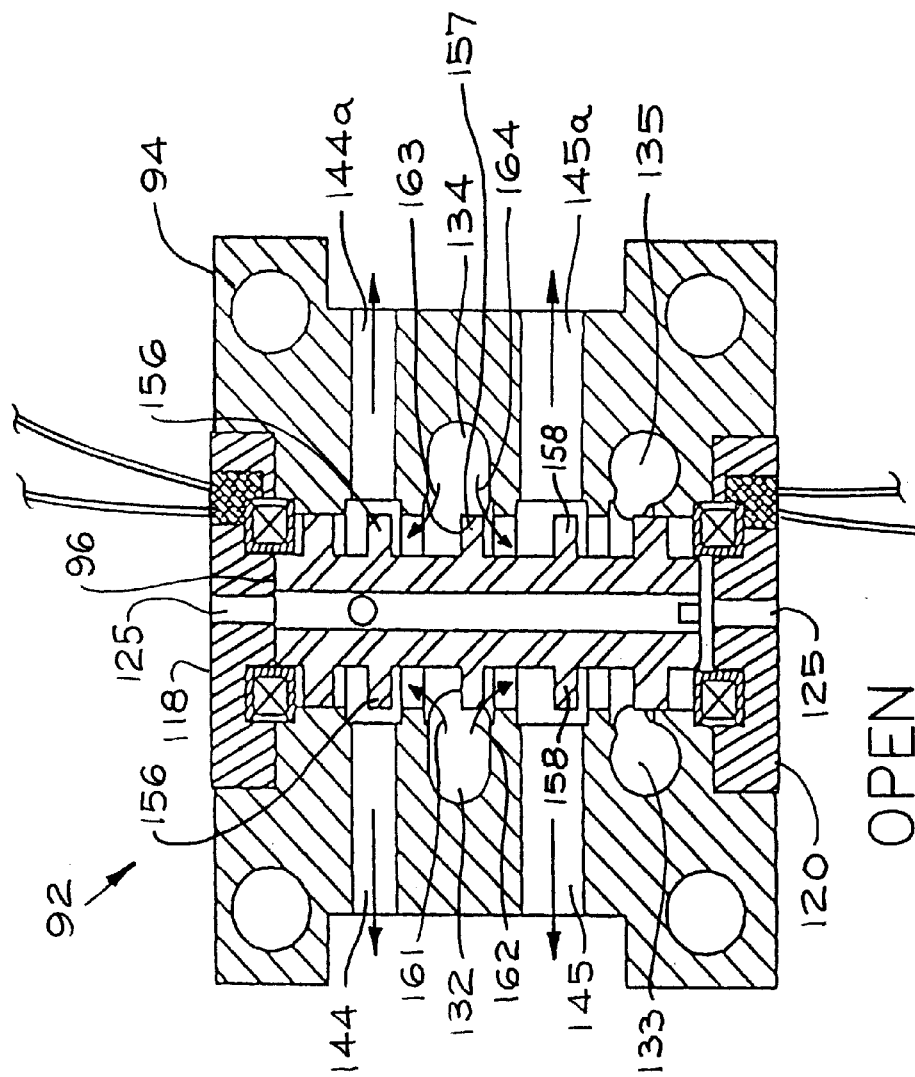
Fig. 16 OPEN

DYNAMIC CONTROL VALVE SYSTEM ADAPTED FOR INFLATABLE RESTRAINT SYSTEMS FOR VEHICLES

This application is a cont. of Ser. No. 09/048,373, filed Mar. 26, 1998, now U.S. Pat. No. 6,068,288.

BACKGROUND OF THE INVENTION

This invention relates to valve assemblies, and more particularly, to a dynamic control valve system adapted for inflatable restraint systems for vehicles.

Currently, there is a need for improved operating characteristics for air bags as safety restraints for occupants of a vehicle for reducing the possibility of injury to such occupants during a crash. Typical air bag systems include an inflatable air bag, a source of pressurized gas, and a control mechanism. The control mechanism couples the air bag to the source of pressurized gas to rapidly inflate the air bag with the pressurized gas if the vehicle is subjected to a high rate of acceleration or deceleration, as may be caused by a crash, for example.

Most known air bag systems provide substantially instantaneous application of high pressure gas to the air bag, resulting in the air bag being inflated at a very high rate and producing large forces. Such speed and force are required in order to restrain a person of average size or larger. However, the high speed with which the air bag opens and the large force with which the expanding air bag contacts the occupant of the vehicle as the air bag is inflated may injure occupants, who are, for example, children or smaller adults. Most air bag inflation systems currently on the market are not dynamically controlled to optimally protect the particular occupant.

Many air bag systems use mechanical or pyrotechnic control inflation of systems to the air bag. This is partly attributable to the relatively slow response time of known electronically controlled valves. In some valves, mechanical springs are used to bias the valve to its closed position. The spring bias must be overcome to open the valve. The spring bias increases response time and also increases the required size of the electrical winding, so that more power is required and more heat is generated Many prior art valves are opened with pressure assist to minimize the time needed to completely open the valve. However, this pressure assist restricts the ability to rapidly close or otherwise adjust the position of the valve after opening.

In addition, known air bag inflation control systems are characterized by complex and costly structures. This is particularly true for valves that employ pressure assist or other mechanical assist Pressure assist valves generally require a pilot valve that is operated by a differential pressures created by orificing and which initiates valve operation, by supplying operating pressure to the valve member of the main valve, or by creating a vacuum by which the main valve is caused to operate at a faster rate.

In recent years, attempts have been made to address some of these problems. One method that has been proposed by some air bag manufacturers is to use multiple inflation containers and firing only the number of containers needed for handling the crash event However, this makes the system controls and layout more complicated. Another method that has been proposed is to use a slower inflation rate. While this can be beneficial to children and adults of smaller stature, this arrangement compromises the safety of the adults who are of average or larger size. Another method is to use multiple stage pyrotechnic devices. Most of these systems typically allow only a single change in inflation.

SUMMARY OF THE INVENTION

The present invention provides a dynamic control valve system adapted for inflatable restraint systems for vehicles. The dynamic control valve system includes a container adapted for at least temporarily containing a fluid under high pressure, and a control valve having a valve inlet in fluid communication with the container and a valve outlet in fluid communication with an inlet of the inflatable restraint. The control valve includes a valve member actuatable between at least a first position in which the control valve is substantially closed and a second position in which the control valve is substantially open. The control valve is arranged to communicate the high pressure fluid through the control valve to the inflatable restraint for inflating the inflatable restraint when the valve member is actuated between the first and second positions. The control valve is constructed and arranged so that actuation of the valve member between the first and second positions is substantially independent of forces produced by flow of the high pressure fluid through the valve, and so that the valve member, when unactuated, is maintained in the first position without mechanical bias.

In accordance with the invention, the inflatable restraint dynamic control valve system further includes a controller which is coupled to the control valve for electrically operating the control valve for actuating the valve member between the first and second positions. The control valve is constructed and arranged to be controlled by the controller to allow the flow rate of the high pressure fluid through the control valve from the valve inlet to the valve outlet to be varied dynamically, thereby varying the rate of inflation of the airbag as a function of said at least one of vehicle parameter and occupant parameter.

In one embodiment, the control valve includes a first valve solenoid for moving the valve member toward the first position and a second valve solenoid for moving the valve member toward the second position. In this embodiment, the valve member, when unactuated, is maintained in the first position without mechanical bias. In another embodiment, the control valve includes a bias structure for urging the valve member toward the first position, and a valve solenoid for moving the valve member, against the force of the bias structure, toward the second position.

In one embodiment of the invention, the control valve includes a valve spool and the valve spool defines split flow paths through the control valve. In addition, the flow paths defined by the valve spool are generally normal to the axis of movement of the valve spool of the control valve. The valve cylinder cooperates with the valve spool to define at least one cross-flow path through the control valve with a major portion of the cross-flow path extending generally normal to the longitudinal axis of the valve cylinder. With this arrangement, the movement of the valve spool between the first and second positions is substantially independent of the high pressure fluid supplied to the control valve as the inflatable restraint inflates. Moreover, when the control valve is operated, one or more leakage paths are provided through the control valve, in parallel with the cross-flow paths.

In addition, the control valve preferably includes an outlet member defining apertures arranged for directing the high pressure fluid introduced into the inflatable restraint along at least one flow path that extends substantially normal to an axis of an inlet of the inflatable restraint. Consequently, there is no direct path into the inflatable restraint at the output of the valve, but rather the output portion of the flow path bends causing the pressurized fluid to be delivered from the valve through outlet ports which have their axes oriented substantially normal to the inlet to the inflatable restraint. Thus, the pressurized fluid is introduced into the inflatable restraint circumferentially and the outlet ports can be disposed diametrically opposed to balance forces and thereby cancel forces generated by the pressurized fluid on the valve. In accordance with a further embodiment, the control valve provided by the invention includes a first valve inlet area located at one end of the valve casing and a second valve inlet area located at the opposite end of the valve casing. In this embodiment, high pressure fluid is introduced into the control valve at locations generally 180° degrees apart. This arrangement balances the inlet pressure, minimizing the effect on valve operation of the high pressure fluid being introduced into the control valve. The control valve further includes a first and second valve outlet areas located at opposite sides of the valve casing and are located generally orthogonal to the first and second valve inlet areas. This configuration provides diffusion for the high pressure fluid being emitted from the control valve and prevents "straight-through" flow from the valve inlets to the valve outlets. Instead, the pressurized fluid circumferentially enters the inflatable restraint. Moreover, locating the valve outlets at generally opposite positions on the valve casing balances and thereby cancels forces generated by the pressurized fluid on the control valve.

BRIEF DESCRIPTION OF THE DRAWINGS

FIG. 2 is an isometric view of a control valve of the dynamic control valve system of FIG. 1;

FIG. 3 is a front elevation view of the control valve of FIG. 2;

FIG. 4 is a side elevation view of the control valve taken generally along line 4—4 of FIG. 3;

FIG. 12 is a vertical cross-sectional view taken generally along the line 12—12 of FIG. 8 with the control valve shown in its closed condition;

FIG. 13 is a view similar to that of FIG. 12 and showing the control valve in its open condition;

FIG. 14 is a vertical cross-sectional view of the control valve taken generally along the line 14—14 of FIG. 9 with the control valve shown in its closed condition;

FIG. 15 is an enlarged view of the valve spool of the control valve of FIG. 14;

FIG. 16 is a view similar to that of FIG. 14 but showing the control valve in its open condition;

DESCRIPTION OF THE PREFERRED EMBODIMENTS

Figure 1:
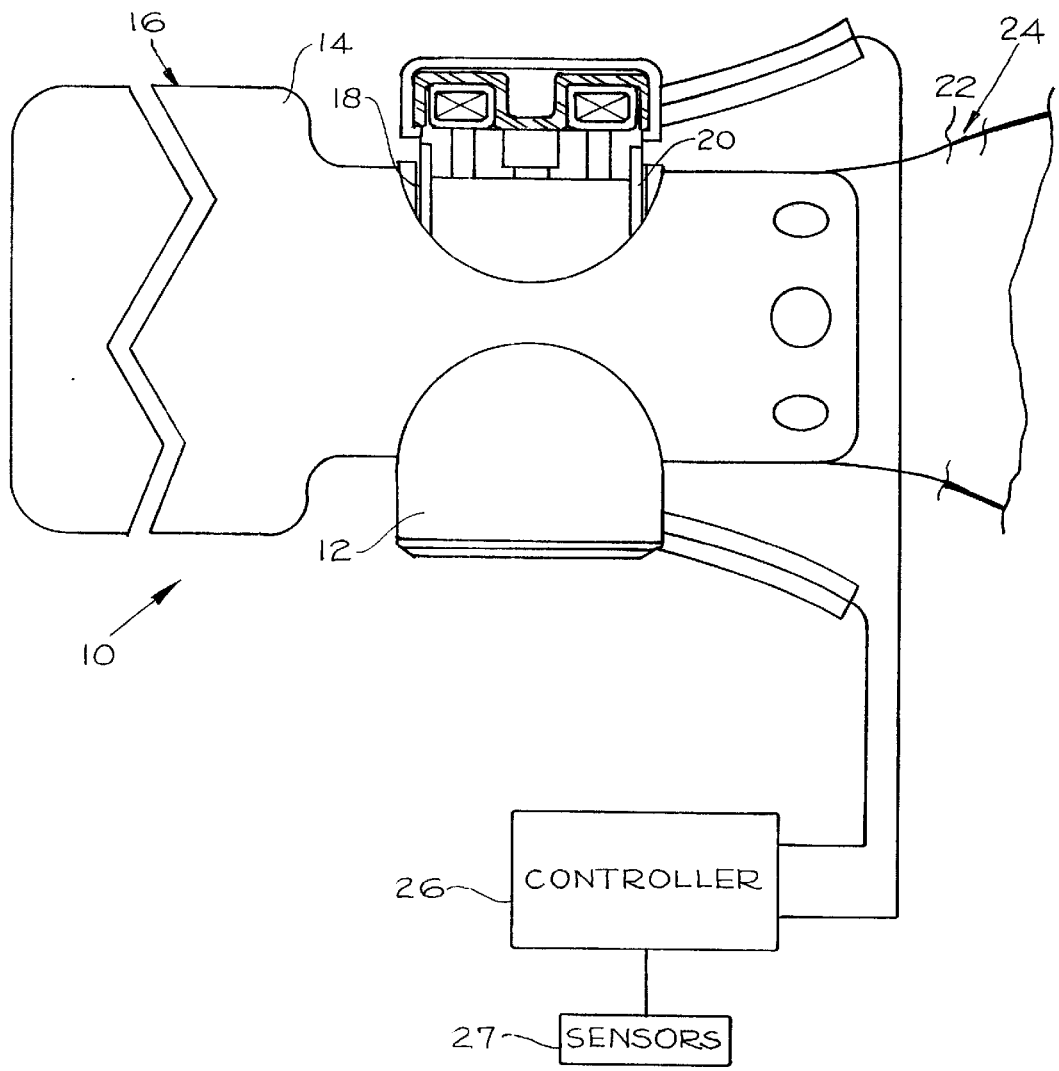
FIG. 1 is a view of the dynamic control valve control system of the invention with the canister partially broken away to illustrate the mounting of the control valve.

Referring to FIG. 1 of the drawings, the dynamic control valve system 10 of the present invention includes a control valve 12 shown mounted within the neck 14 of a canister or other container 16. The control valve 12 has an inlet 18 connected to an outlet of the canister 16 and an output 20 adapted to be connected to an inlet 22 of a vehicular occupant-resistant inflatable restraint 24, a portion of which is shown in FIG. 1. It is understood that the inflatable restraint 24 may be used to restrain occupants and/or other objects within a vehicle. Inflatable restraints include inflatable air bags, inflatable bolsters, inflatable curtains, and other types of inflatable restraining devices. The canister 16 functions as a source of a high pressure fluid for inflating the inflatable restraint. The control valve 12 controls the rate of inflation of the inflatable restraint. The canister 16 is preferably compact to facilitate efficient mounting within a vehicle. As used herein, vehicle is defined as a means of carrying, or transporting something such as passengers and/or items. For example, vehicle can be a land-based vehicle, such as automobiles, trucks, buses, motorcycles railway engines and cars, a water-based vehicle such as boats or ships or submarines, or a flying vehicle such as aircraft or space vehicles.

In one embodiment, airbag inflation is caused by a pyrotechnic expansion of gases contained in a high pressure canister for supplying a fluid under high pressure to the airbag. Typically, the discharge pressure is approximately 3500–6000 psi. Alternatively, the canister may store a pressurized fluid which is supplied to the airbag. This advantageously provides smokeless inflation and avoids the undesirable effects of the relatively large pyrotechnic explosion, such as the generation of particulates and loud explosion noises. The canister typically includes a conventional rupture diaphragm (not shown). In a further alternative; the inflation of the inflatable restraint can be provided using a combination or hybrid arrangement of the two inflation techniques.

The canister temporarily contains the fluid under high pressure, following the pyrotechnic event. In a second embodiment, the high pressure fluid is continuously contained in the canister until a disc seal (not shown) is intentionally ruptured, in a known manner, allowing the pressurized fluid to flow into the control valve to be introduced into the inflatable restraint for inflating the inflatable restraint.

The dynamic control valve system 10 includes a controller 26 for controlling the operation of the control valve 12. The controller 26 is coupled to the control valve 12 for electrically actuating the control valve between flow preventing and flow permitting conditions based upon one or more parameters selected from vehicle parameters and/or occupant parameters. For example, the vehicle parameters preferably include vehicle direction, vehicle deceleration, and vehicle acceleration. The occupant parameters preferably include position, presence, size and/or weight of a vehicle occupant such as the driver and/or passenger(s).

Referring to FIGS. 2–6, in one embodiment, the control valve 12 includes a spool valve having a casing or body 30 and a valve spool 32 that is mounted within the casing. The valve spool 32 is adapted for reciprocal movement between a first position at which the valve is closed and a second position in which the valve is open. While directions and orientations are used herein for illustrative purposes, it will be apparent that the present invention can operate effectively in any desired direction or orientation. In one embodiment, the control valve 12 includes a first valve solenoid 34 for selectively moving the valve spool 32 toward the fluid flow preventing position, and a second valve solenoid 36 for selectively moving the valve spool 32 away from the fluid flow preventing position.

The valve casing 30 is preferably generally cylindrical in shape and includes an outer peripheral wall portion 38 and a central bore 40 formed though the casing from it top end 41 to its bottom end 42. The valve casing 30 includes a plurality of peripheral grooves extending through the wall portion 38. The peripheral grooves include a plurality (e.g., a pair) of inlet grooves or inlet ports 44a and 44b which are provided on the forward side of the valve casing. A plurality (e.g., a pair) pair of outlet grooves or outlet ports 44c and 44d are provided on the rearward side of the valve casing. The grooves 44a and 44b and the grooves 44c and 44d are preferably dimensioned differently so that flow paths of different volumes are defined through the control valve. In one embodiment, the upper inlet groove 44a has larger axial width than the lower inlet groove 44b.

The casing 30 includes top and bottom cover plates 46 and 47. The top and bottom cover plates 46 and 47 each define an annular recess 48 for locating the solenoid windings 34 and 36. The outer edges of the bore 40 through the valve casing are countersunk to define an index for the solenoid windings. The cover plates 46 and 47 are mounted in the recessed areas 48 at the top and bottom of the valve casing to enclose the solenoid winding. The cover plates are flush with the upper and lower surfaces of the casing. Each cover plate has an opening 49 therethrough for the leads 50 (FIG. 1) for the solenoid winding. In addition, each cover plate can have a vent opening (not shown) formed therethrough which is arranged in fluid communication with the center 54 of the valve spool. This allows substantially equal pressures to be provided at opposite ends of the valve spool. Maintaining substantially equal pressures at opposite end of the valve spool assures fast operation of the valve spool during dynamic operation of the control valve. The cover plates can be held in place by fasteners such as machine screws 56.

Referring to FIG. 4, the valve casing 30 includes valve inlet area 18 at one side and a valve outlet area 20 at the opposite side. The valve inlet area 18 includes grooves 44a and 44b which define a plurality of inlet ports for the control valve 12. The grooves 44a and 44b are formed through the wall portion 38 from the outer surface to the interior of the valve casing and extend circumferentially over less than 180° of the wall portion 38. The grooves are of sufficient depth to communicate with the valve spool 32.

Similarly, the valve outlet area 20 includes grooves 44c and 44d which define a plurality of outlet ports for the control valve. The grooves 44c and 44d are formed through the wall portion 38 from the outer surface to the interior of the casing and extend circumferentially over less than 180° of the wall portion 38. The grooves are of sufficient depth to communicate with the valve spool 32.

Figure 5:
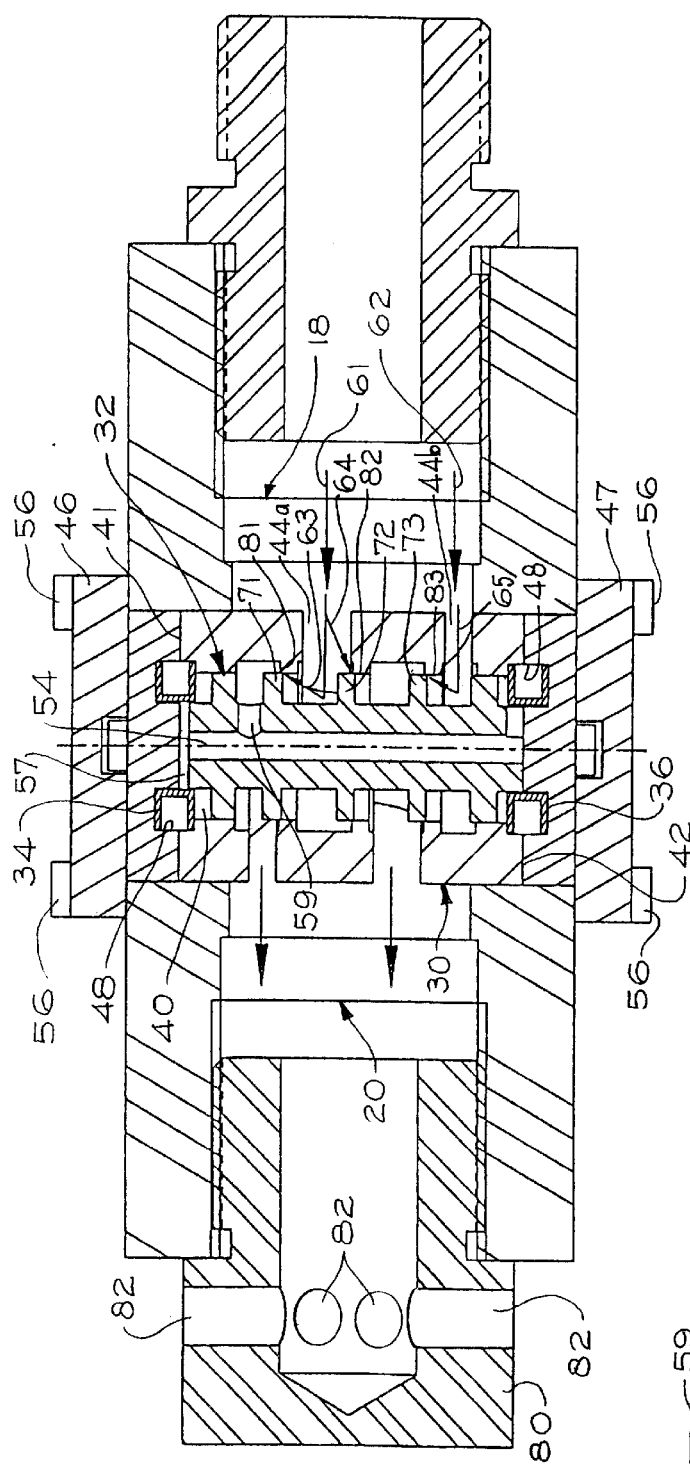
FIG. 5 is a vertical cross-sectional view of the control valve of the invention, illustrating the fluid flow paths through the valve.
Figure 6:
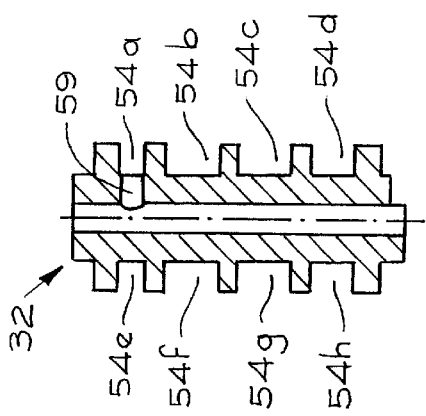
FIG. 6 is an enlarged view of the valve spool of the control valve of FIG. 5.

Referring also to FIGS. 5 and 6, the valve spool 32 is generally cylindrical in shape and is substantially circular in cross-section. The outer diameter of the valve spool substantially corresponds to the inner diameter of the bore of the casing. The valve spool includes a plurality of circumferential grooves extending around the cylindrical member, including inlet grooves 54a–54d and outlet grooves 54e–54h. The inlet grooves 54b, 54c and 54d are provided on the forward side of the valve spool and cooperate with the grooves 44a and 44b in the valve casing to define a plurality of inlet ports for the control valve. The outlet grooves 54e, 54f and 54g on the rearward side of the valve spool cooperate with the grooves 44c and 44d in the valve casing to define a plurality of outlet ports for the control valve. The inlet grooves 44a and 44b of the valve casing communicate with the outlet grooves 44c and 44d of the casing through the valve spool 32. The valve inlet 18 communicates with the valve outlet 20 through the grooves 44a–44d and grooves 54b–54d and 54e–54g whenever the valve spool 32 is moved toward its flow permitting position. This allows the high pressure fluid from the canister 16 (FIG. 1) to flow through the grooves 54 from the valve inlet to the valve outlet as the valve spool is moved away from its flow preventing position. The valve spool 32 of the control valve 12 is oriented transversely to the direction of flow through the control valve. FIG. 5 illustrates the control valve in its flow preventing condition with the top end of the valve spool spaced from the cover plate 46, providing a gap 57 there between. In one embodiment, residual magnetism maintains the valve spool in a position to which it has been driven. Thus, the valve spool 32, when actuated, moves in a direction such that fluid flow through the control valve is substantially normal to the direction in which the valve spool is moved. Therefore, the high pressure fluid flowing through the control valve provides very little or most preferably, no effective pressure assist for the operation of the control valve.

Stated in another way, a major portion of the cross-flow paths for the high pressure fluid extends generally normal to the longitudinal axis of the valve cylinder. The cross-flow paths provided through the control valve balance forces produced by the fluid. Thus, the operation of the control valve is substantially independent of forces produced by flow of the high pressure fluid that is being introduced into the control valve. Consequently, the movement of the valve spool between the first and second positions is substantially independent of the high pressure fluid being supplied to the control valve as the inflatable restraint 24 (FIG. 1) is being inflated.

Flow Paths

Referring to FIGS. 5–6, when the disc seal in the outlet of the canister 16 is ruptured, high pressure fluid is supplied to the inlet 18 of the control valve and flows through the inlet ports defined by the grooves 44a and 44b. When the control valve is in its unoperated, or flow preventing condition, is shown in FIG. 6, the valve spool 32 is positioned such that its portions 71, 72 and 73 engage respective inner surfaces 81, 82 and 83 of the casing. This blocks fluid flow from the inlet ports 44a, 44b to the outlet ports 44c, 44d. However, when the control valve is in its operated, or flow permitting condition, the valve spool 32 is positioned with its portions 71, 72 and 73 of the valve spool 32 are spaced moved out of engagement with surfaces 81, 82 and 83 of the casing.

For such condition, the high pressure fluid is supplied to the inlet 18 of the control valve 12 with a first portion of the fluid flowing into groove 44a, as indicated by arrow 61, and a second portion of the fluid flowing into groove 44b, as indicated by arrow 62. The high pressure fluid flowing through groove 44a is directed upward past surface 81 of the casing and downward past surface 72 of the valve spool, over split flow paths represented by arrows 63 and 64. The fluid flowing over path 63 is directed by the grooves 54b and 54e in the valve spool to groove or outlet port 44c. The fluid flowing on flow path 64 is directed by the grooves 54c and 54g in the valve spool to groove or outlet port 44d.

In addition, the portion of the high pressure fluid flowing through groove 44b is directed upward past surface 83 of the casing over a flow path represented by arrow 65. The fluid flowing on flow path 65 is directed by the groove in the valve spool to groove 44c where it combines with the portion of the fluid flowing along flow path 64.

Thus, the valve spool 32 cooperates with the valve casing 30 to define split flow paths 61 and 62 through the control valve, with the high pressure fluid flow path 61 being split into two flow paths 63 and 64 internal to the control valve. The fluid flowing over flow path 65 is combined with the portion of the fluid flowing over flow path 64 at the outlet of the control valve.

In accordance with the invention, the valve spool defines one or more leakage paths through the control valve. In one embodiment, a single path to provide for fluid flow, the path being defined by bore 59 between groove 54a and the interior 54 of the valve spool. The path is provided to both ends of the control valve to balance of fluid pressure at both ends of the valve with the lower pressure on the outlet side in grooves 54a and 54c. This allows substantially equal pressures to be provided at opposite ends of the valve spool. Maintaining substantially equal pressures at opposite end of the valve spool assures fast operation of the valve spool during dynamic operation of the control valve.

The leakage path or (paths) allows a predetermined volume of the high pressure fluid to leak through the control valve upon rupture of the disc seal of the canister 16, supplying fluid under pressure to the inlet 18 of the control valve. The leakage path establishes a minimum flow rate through the control valve. Subsequent actuation of the control valve increases throughflow, which speeds up the rate of inflation of the inflatable restraint. Both the amount of leakage through the control valve and the positioning of the valve spool help control the rate of inflation of the inflatable restraint.

Referring to FIG. 5, the control valve 12 includes an outlet member 80 for directing the high pressure fluid being introduced into the inflatable restraint 24 (FIG. 1). Preferably, the high pressure fluid is directed into the inflatable restraint 24 along at least one flow path that extends substantially normal to a major axis of the inflatable restraint. In one embodiment, this is accomplished by directing the flow of the high pressure fluid at the outlet of the control valve into the inflatable restraint along at least one flow path that extends at approximately ninety degrees relative to the fluid flow axis of the control valve.

To this end, in accordance with one embodiment, the outlet member 80 of the control valve includes apertures 82 for directing the high pressure fluid introduced into the inflatable restraint 24 along at least one flow path that extends substantially normal to an axis of an inlet of the inflatable restraint. In one embodiment, the apertures 82 include one of more pairs of opposing apertures which provide for canceling of the flow forces created by the high pressure fluid exiting the apertures of each pair. For example, the outlet member can include three pairs of apertures with the apertures of each pair of apertures being located in diametrically opposed and radially-extending positions along the circumference of the outlet member. Consequently, the high pressure fluid is introduced into the inflatable restraint along a plurality of flow paths.

In the embodiment shown in FIG. 5, the control valve 12 is a solenoid operated valve including a first valve solenoid 34 and a second valve solenoid 36. The first valve solenoid 34 operates the valve spool toward its open or flow permitting position from its closed or flow preventing position. The second valve solenoid 36 operates the valve spool 32 toward its closed position from its open position. The valve solenoids are individually operable and allow the spool valve to be moved or shuttled between its closed and open positions during the inflation of the inflatable restraint. In addition, in driving the valve spool to either its open or closed portion by activating the appropriate one of the solenoids 34 and 36, the other solenoid 36 or 34 can be activated with a short duration pulse of negative polarity to assist in overcoming residual magnetism.

Figure 7:
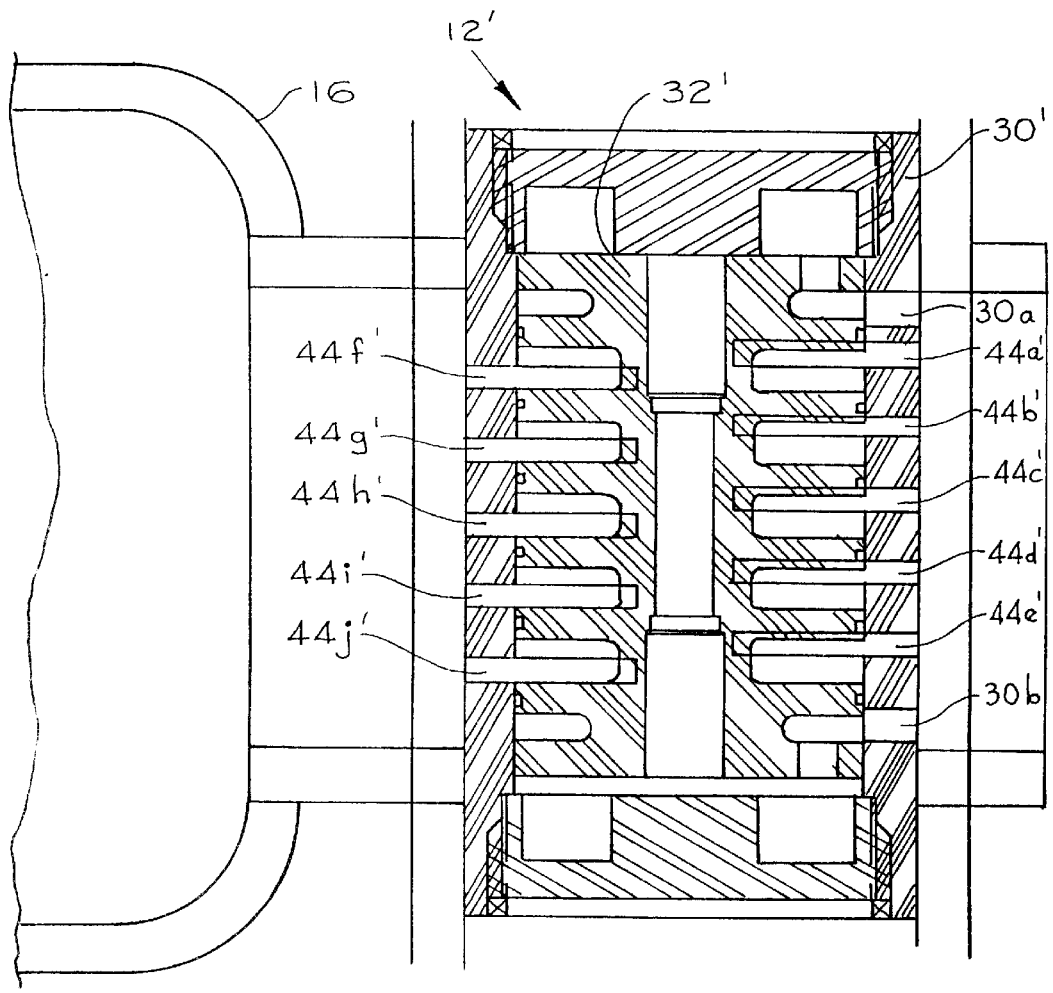
FIG. 7 is a vertical cross-sectional view of the control valve similar to FIG. 6 but provided in accordance with another embodiment of the invention.

The control valve 12, illustrated in FIGS. 2–6, for example, has first and second valve inlets 44a and 44b which are communicated with first and second valve outlets 44c and 44d by the valve spool 32. However, the control valve can have a greater number of valve inlets and valve outlets, and the configuration of the valve inlets and outlets can be different from that for control valve 12. FIG. 7 illustrates a further embodiment for a control valve 12' which can be used in the dynamic control valve system of FIG. 1. The control valve 12' is shown mounted in the neck of the canister 16. The control valve 12' has five valve inlets 44a'–44e and five valve outlets 44f'–44j' which communicate with the valve inlets 44a'–44', respectively, by the valve spool 32' by way of grooves formed in valve spool 32'. In addition, the valve casing 30' includes a first inlet 30a vented to the top of the valve casing and a second inlet 30b vented to the bottom of the valve casing. The first and second inlets 30a, 30b advantageously equalize the axial pressures on the valve spool when high pressure fluid is supplied to the control valve.

FIGS. 8–12 and 14 illustrate a further embodiment of a control valve 92 which can be used in the dynamic control valve system of the invention. The control valve 92 is a spool valve including a casing 94 and a valve spool 96 that is mounted within the casing. The valve spool is adapted for vertical movement between a first position in which the valve is closed or in its flow preventing condition and a second position in which the valve is open or in its flow permitting condition.

In one embodiment, the valve casing 94 is formed in a part that is attached to the outlet end of the canister 16 (FIG. 1). The part can be connected to the canister 16 in any suitable manner, such as by welding. Preferably the elements of the control valve 92 are assembled prior to mounting the control valve on the canister 16.

The valve casing 94 is a solid block having, for example, a generally rectangular or cylindrical cross-section. The valve casing 94 has a top 101, a bottom 102, opposing end walls 103, 104 and opposing sidewalls 105–106. Referring to FIG. 12, the valve casing 94 has a cylindrical bore 108 formed therethrough between the top and bottom. The top and bottom walls are counterbored defining respective recesses 110 and 112 therein for locating a pair of solenoid windings 114 and 116. The control valve 92 includes cover plates 118 and 120 which are mounted in respective recesses 110 and 112 to enclose the solenoid windings. The cover plates 118 and 120 are flush with the top and bottom surfaces 101, 102 of the valve casing. Each of the cover plates has an opening 123 therethrough for the electrical leads 124 of the solenoid windings 114, 116. In addition, each of the cover plates has 118 and 120 has a vent opening 125 formed therethrough which is in fluid communication with the center of the valve spool 96. The cover plates 118 and 120 can be held in place by machine screws, for example.

Figure 8:
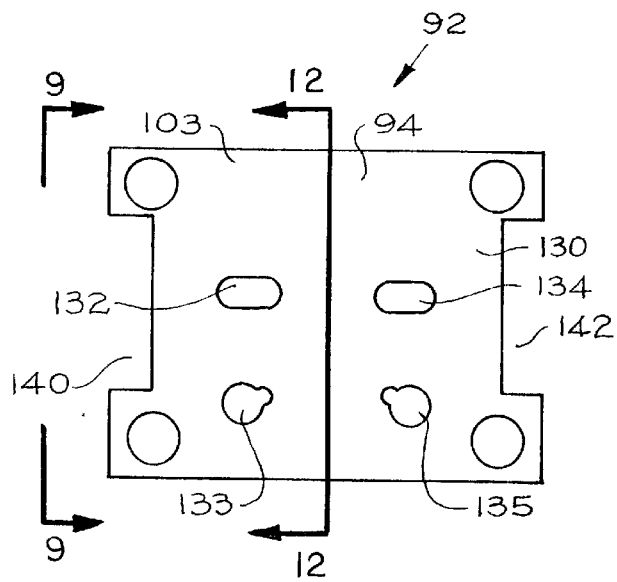
FIG. 8 is a front elevation view of a control valve similar to FIG. 3 but in accordance with a further embodiment of the invention.
Figure 9:
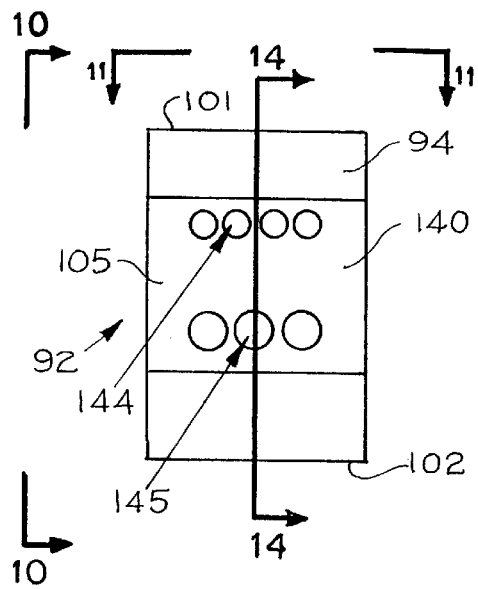
FIG. 9 is a side elevation view of the control valve taken generally along line 9—9 of FIG. 8.
Figure 10:
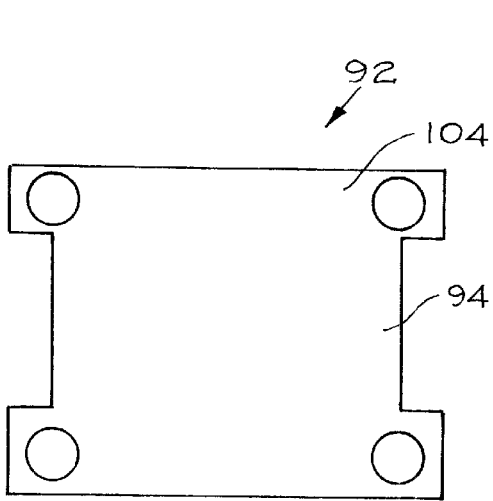
FIG. 10 is a rear elevation view of the control valve taken generally along line 10—10 of FIG. 8.

Referring to FIGS. 8 and 9, the casing includes a valve inlet 130 at one end including a plurality of inlet ports defined by bores 132 and 134. In one embodiment, bores 132 and 134 are generally oval in cross-section and are formed through the endwall 103 from the outer surface to the interior of the casing. The bores 132 and 134 are of sufficient length to intersect metering lands 150 (FIG. 12) on the valve spool. The valve inlet 130 also includes bores 133 and 135 defining inlet ports that have a generally keyhole-like cross-section. The bores 133 and 135 are formed through end wall 103 and are of sufficient length to intersect metering lands 150 on the valve spool.

Figure 11:
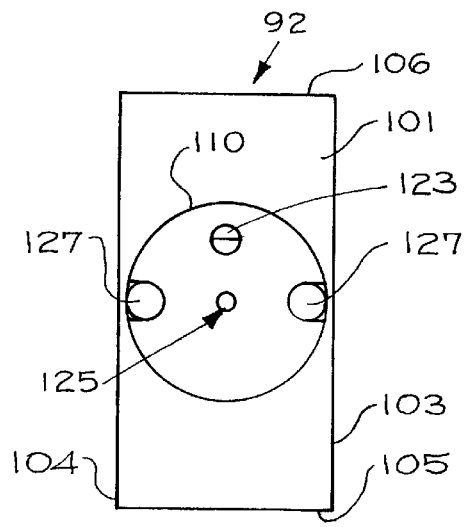
FIG. 11 is a top plan view of the control valve taken generally along line 11—11 of FIG. 8.

Referring to FIGS. 8 and 11, the valve casing 94 includes a valve outlet 140 at one side and a valve outlet 142 at the opposite side. Each valve outlet, such as valve outlet 140, includes a plurality of outlet ports. In one embodiment, the outlet ports include four small bores 144 grouped together and three larger bores 145 which are grouped together. The smaller bores 144, which are of a first diameter, extend in substantial alignment from the surface of side wall 105 straight into the interior of the valve casing to intersect exhaust lands 152 (FIG. 14) on the valve spool 96. The bores 145 are of a second diameter that is larger than the diameter of the bores 144, and extend in an aligned relation from the surface of side wall 105 to the interior of valve and are located below the bores 144. The bores 145 intersect exhaust lands 152 on valve spool 96. Similarly, valve outlet 142 includes a plurality of outlet ports formed by small bores 144a and large bores 145a (FIG. 14).

The valve spool 96 is generally cylindrical in shape and includes grooves 148 formed along its outer surface. The inlet ports 132–135 of the control valve communicate with the outlet ports 144–145 of the control valve via the grooves 148 of the valve spool whenever the valve spool 96 is moved away from its flow preventing position. This allows high pressure fluid supplied to the valve inlet 130 to flow through the grooves 148 from the valve inlet ports 132–135 to the valve outlet ports 144–145 when the valve spool is moved away from the flow preventing position. When the control valve is in its flow preventing condition, the top end of the valve spool is spaced from the cover plate 118, defining a gap 97 therebetween. In one embodiment, residual magnetism between the end of the valve spool 96 and the cover plate 118 (or 120) maintains the valve spool in a position to which it has been driven.

The valve spool 96 defines a plurality of metering lands 150 (FIG. 12) and a plurality of exhaust lands 152 (FIG. 14). The inlet bores 132–135 are formed to intersect the metering lands 150 and the outlet bores 144–145 are formed to intersect the exhaust lands 152.

The longitudinal axis of valve spool 96 is oriented transversely to the direction of fluid flow through the control valve. Thus, the valve spool 96, when actuated, moves in a direction which is substantially normal to the direction of fluid flow through the control valve. Moreover, the first and second valve inlets (defined by inlet ports 132, 133 and inlet ports 134, 135 respectively) are arranged to cause the high pressure fluid to be introduced at locations disposed 180° relative to one another so that the control valve is sully compensated. This ensures substantially balanced pressures at the valve inlets, resulting in substantially no net radial force being applied to the valve spool as could affect its operation.

For example, locating the valve inlet at one side of the end and the valve outlet at the opposite side of the valve would result in fluid flow paths that extend straight through the valve. The resultant unidirectional forces applied to the valve spool as the result of the introduction of the high pressure fluid at one side could move the valve spool sideways within the inner bore of the casing, resulting in increased frictional forces on the valve spool. Depending upon the inlet pressure, these frictional forces could exceed the operating force provided by the valve solenoids, affecting operation of the valve. Moreover, such frictional forces could affect the shuttle time of the control valve.

However, the operation of the control valve provided by the invention, which provides balanced pressures at the valve inlets, is substantially independent of forces produced by flow of the high pressure fluid that is being introduced into the control valve.

Referring to FIGS. 8, 12, 14 and 15, for the unoperated or flow preventing condition for the control valve 92, the valve spool 96 is positioned to interrupt fluid flow paths through the control valve. When the control valve is in its flow preventing condition, the valve spool 96 is positioned as shown in FIGS. 12 and 14 such that its portions 156, 157 and 158 are interposed between the metering lands 150 and the exhaust lands 152, blocking fluid flow from the inlet ports 132, 133, 134 and 135 to the outlet ports 144 and 145.

However, when the control valve is operated to its flow permitting condition, the valve spool 96 is moved to its position shown in FIGS. 13 and 16. There, its portions 156, 157 and 158 have been moved out of its flow preventing relationship relative to the metering lands 150 and the exhaust lands 152, as shown in FIGS. 13 and 16. For such condition, a first portion of the high pressure fluid supplied to the valve inlet 130 of the control valve 92 flows into bores 132 and 133 and a second portion of the fluid flows into bores 134 and 135. The high pressure fluid flowing into the bore 132 is split and directed over separate flow paths. The separate flow paths include a flow path upward past portion 156 of the valve spool and a flow path downward past portion 157 of the valve spool to bore 145, along flow path portions represented by arrows 161 and 162. This high pressure fluid flows out of the valve through valve outlet ports 144. The fluid flowing into bore 133 is directed by portion 153 of the valve spool to bore 145 where it combines with the portion of the fluid flowing past portion 157 and flows out of the valve through valve outlet ports 145. The size and shape of the ports is selected such that the flow path through the control valve does not restrict the flow into the control valve from the canister.

Similarly, the high pressure fluid flowing into the bore 134 is split and directed over separate flow paths. These separate flow paths include a flow path upward past portion 156 of the valve spool and a flow path downward past portion 157 of the valve spool to bore 145, over flow path portions represented by arrows 163 and 164. This high pressure fluid and flows out of the valve through valve outlet ports 144a. The fluid flowing into bore 135 is directed by portion 153 of the valve spool to bore 145 where it combines with the portion of the fluid flowing past portion 157 and flows out of the valve through valve outlet ports 145a.

Thus, the valve spool 96 cooperates with the valve casing 94 to define split flow paths through the control valve, with one of the fluid flow paths being split into two separate flow paths internal to the control valve.

As has been illustrated above, the outlet ports 144, 145 and 144a and 145a are located on opposite sides 105 and 106 of the control valve casing. Because the outlet ports are disposed normal to the inlet ports, and are provided at opposite sides of the control valve, the high pressure fluid introduced into the inflatable restraint 16 is directed along flow paths that extend substantially normal to a major axis of the inflatable restraint. Moreover, this is achieved without the need for an outlet member. This provides automatic diffusion for the high pressure fluid as it is being introduced into the inflatable restraint.

Referring to FIGS. 14 and 16, the interior of the valve spool 96 is vented to a common pressure, which can be atmospheric pressure, or some other common pressure. To this end, vent holes 125 are provided in the cover plates 118 and 120 at the top and bottom of the control valve casing 94. This allows substantially equal pressures to be provided at opposite ends of the valve spool. Maintaining substantially equal pressures at opposite end of the valve spool assures fast operation of the valve spool during dynamic operation of the control valve.

Figure 17:
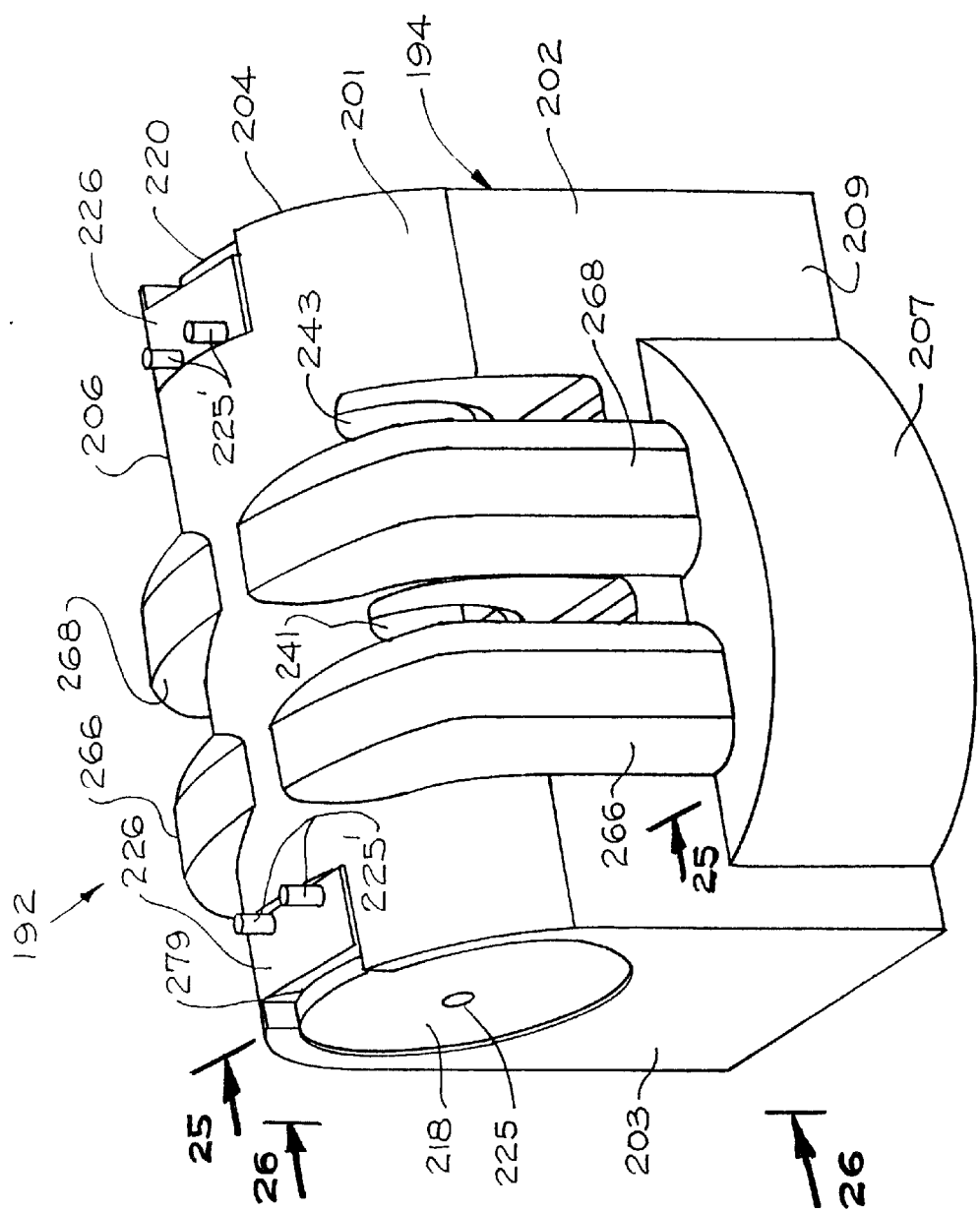
FIG. 17 is an isometric side view of a control valve in accordance with a further embodiment of the invention.
Figure 18:
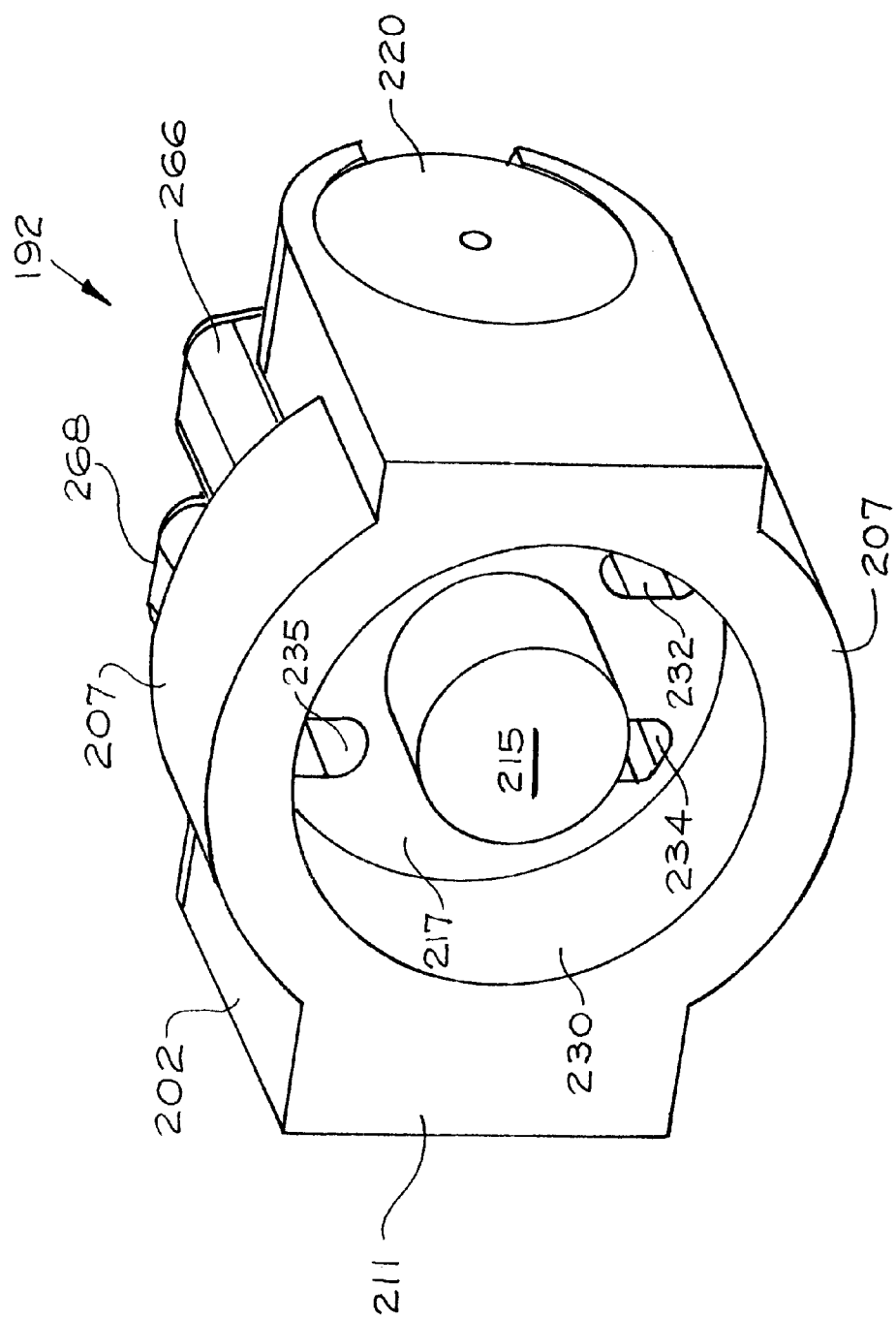
FIG. 18 is an isometric bottom view of the control valve of FIG. 17.
Figure 23:
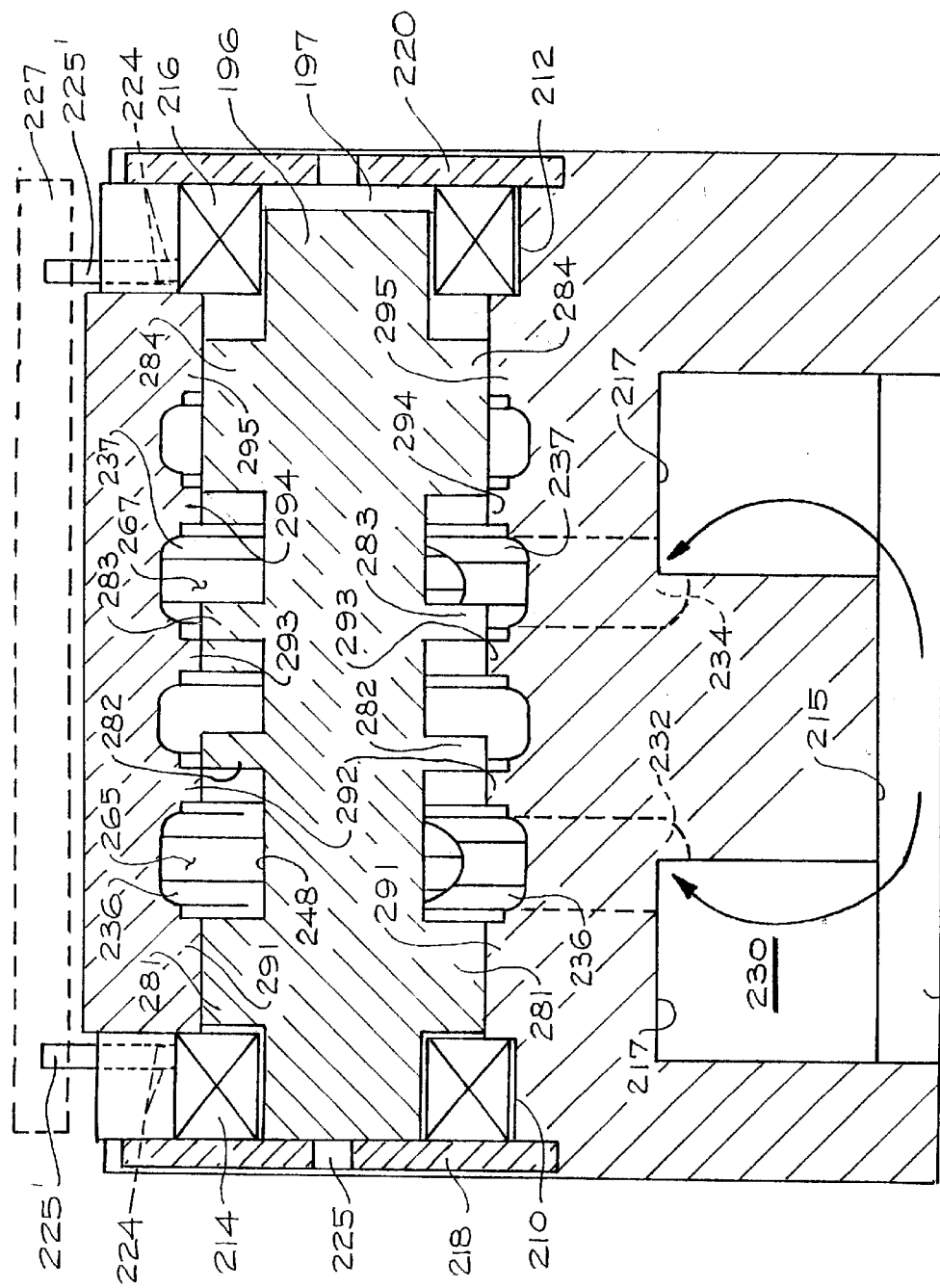
FIG. 23 is a transverse cross sectional view taken generally along the line 23—23 of FIG. 22.
Figure 24:
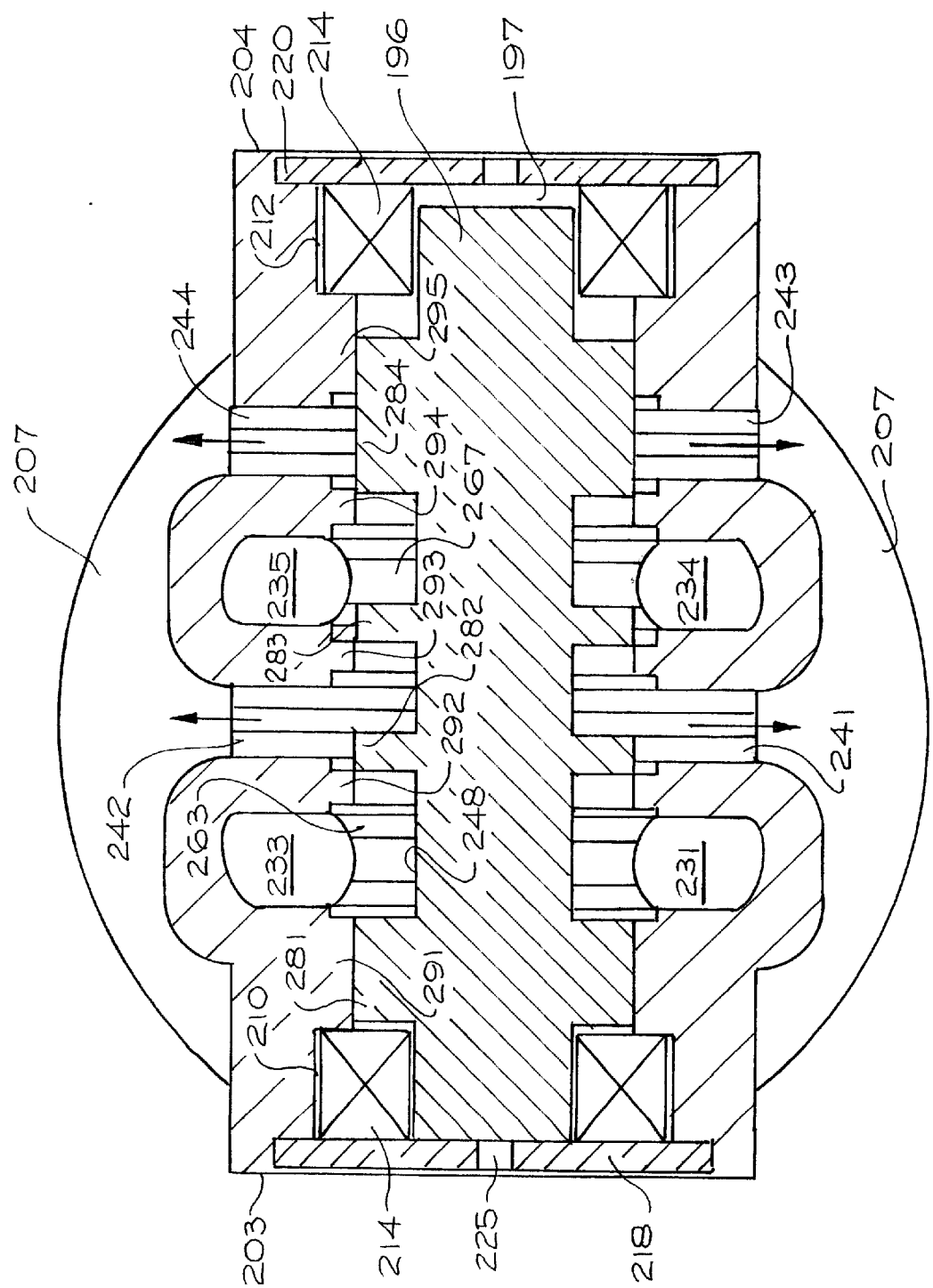
FIG. 24 is a vertical cross-sectional view taken generally along the line 24—24 of FIG. 19.
Figure 25:
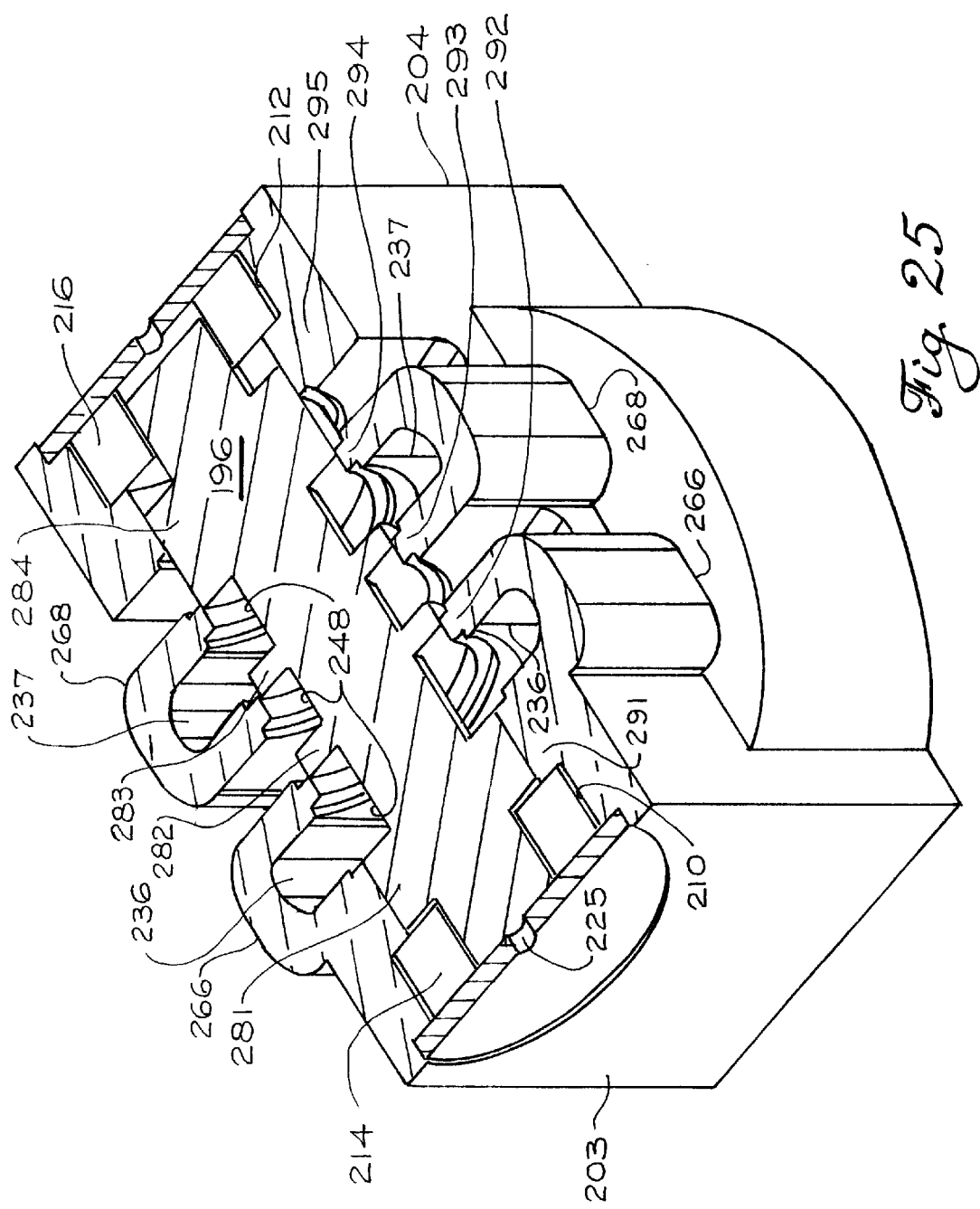
FIG. 25 is a transverse cross-sectional view taken generally along the line 25—25 of FIG. 17.
Figure 26:
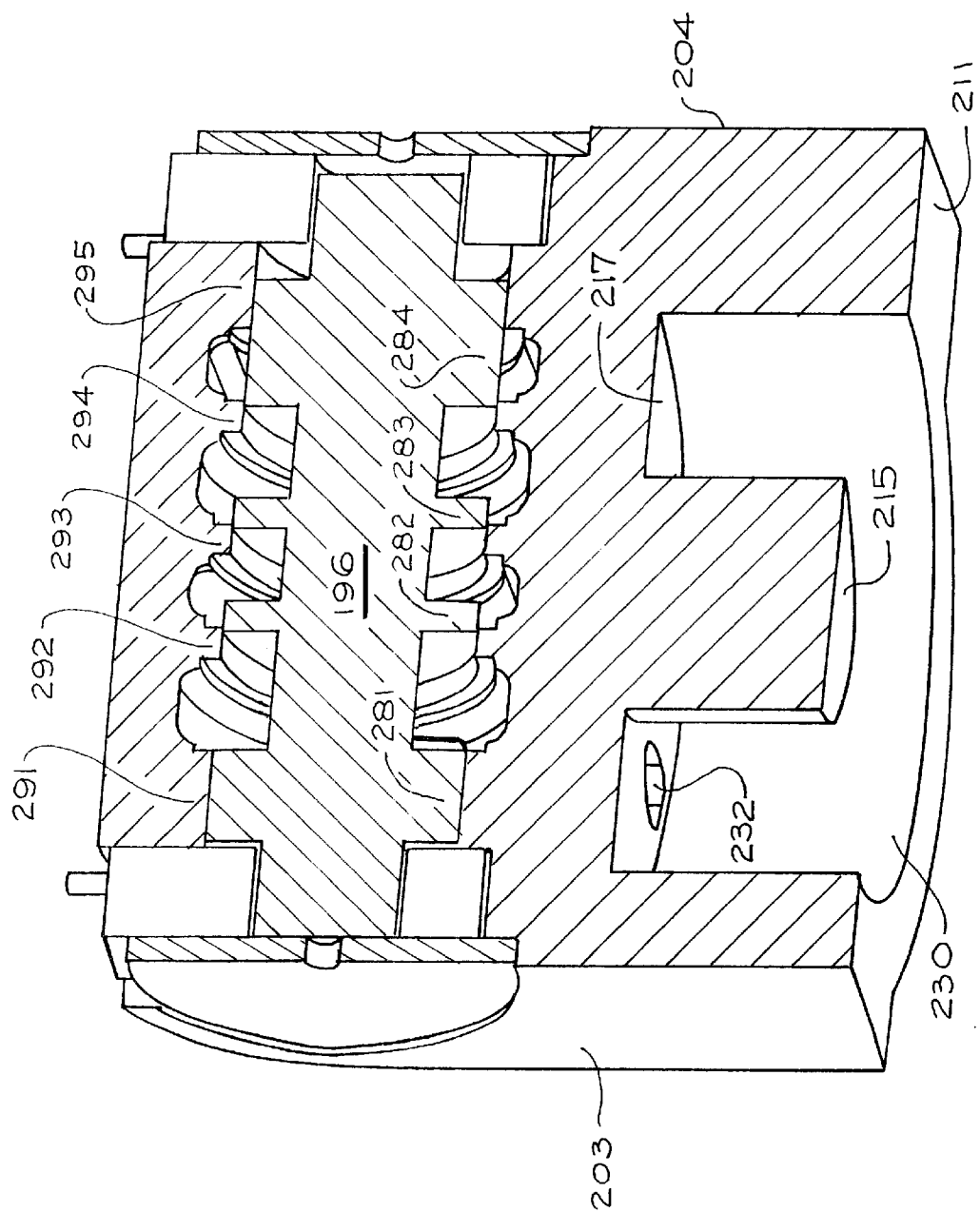
FIG. 26 is a vertical cross-sectional view taken generally along the line 26—26 of FIG. 17.

FIGS. 17–26 show a further preferred embodiment of a control valve 192 which can be used in the dynamic control valve system of the invention. Referring to FIGS. 17, 18 and 25, the control valve 192 includes a valve casing 194 and a valve spool 196 within the valve casing. The valve spool 196 is adapted for reciprocating movement between a first position, shown in FIG. 25, in which the valve is closed or in its flow preventing condition, and a second position in which the valve is open or in its flow permitting condition, as will be described.

The valve casing 194 includes an upper portion 201, a lower portion 202, opposing end walls 203 and 204, and sides indicated generally at 205 and 206. The valve casing 194 includes a generally cylindrical bore 208 in the upper portion 201 of the valve casing, extending between the end walls 203 and 204. The valve spool 196 is located in the bore.

Referring to FIGS. 17, 18, 21, 23 and 25, the lower portion 202 of the valve casing is generally rectangular in shape and has arcuate sections 207 extending outwardly from its sides 205 and 206 near the lower edges 209 thaereof. The valve inlet 230 is defined at the bottom of the valve casing. To this end, the lower portion 202 of the valve casing has a generally flat bottom 211 with an annular channel 213 therein which defines an outwardly extending cylindrical boss 215 and a generally annular bottom wall 217 which is spaced inwardly from the bottom 211. The annular bottom wall 217 includes a plurality of valve inlet ports, which in one embodiment includes four inlet ports 232–235, which communicate the valve inlet 230 with a plurality of internal pressure chambers, such as pressure chambers 236 and 237 for the embodiment of the control valve of FIGS. 17–26, as will be shown.

More specifically, the four inlet ports 232–235 are spaced apart from one another on the annular bottom wall 217. One pair of the inlet ports 232 and 233 is communicated with pressure chamber 236. The other pair of inlet ports 234 and 235 is communicated with pressure chamber 237. The pressure chamber 236 is defined by inner surfaces 265 of the main body portion of the valve casing 194 and by a pair of generally U-shaped extensions 266 of the sides 205 and 206 of the valve casing. Similarly, the pressure chamber 237 is defined by inner surfaces 267 of the main body portion of the valve casing and by a pair of generally U-shaped extensions 268 of the sides 205 and 206 of the valve casing. The pressure chambers 236 and 237 define a pair of generally annular flow paths for the high pressure fluid. The flow paths extend circumferentially of the valve spool. The pressure chambers 236 and 237 are spaced apart axially of the valve spool 196. The axes of the valve inlet ports 232–235 extend normal to the plane of the axis of the valve spool 196.

In one embodiment, the valve casing 194 is adapted to be attached to the outlet end of the canister 16 (FIG. 1) in any suitable manner, such as by welding along the surface of the bottom 211. Preferably, the elements of the control valve 192 are assembled prior to mounting the control valve on the canister 16. A filter 250, shown in FIG. 23, is mounted on the bottom of the casing, interposed between the outlet of the canister (not shown) and the inlet 230 of the control valve. The boss 215 of the valve inlet supports the center portion of the filter 250. The valve casing 194 is made of a rigid material, such as steel, for example. The valve casing preferably is produced using a metal casting process, and most preferably by investment casting.

Figure 19:
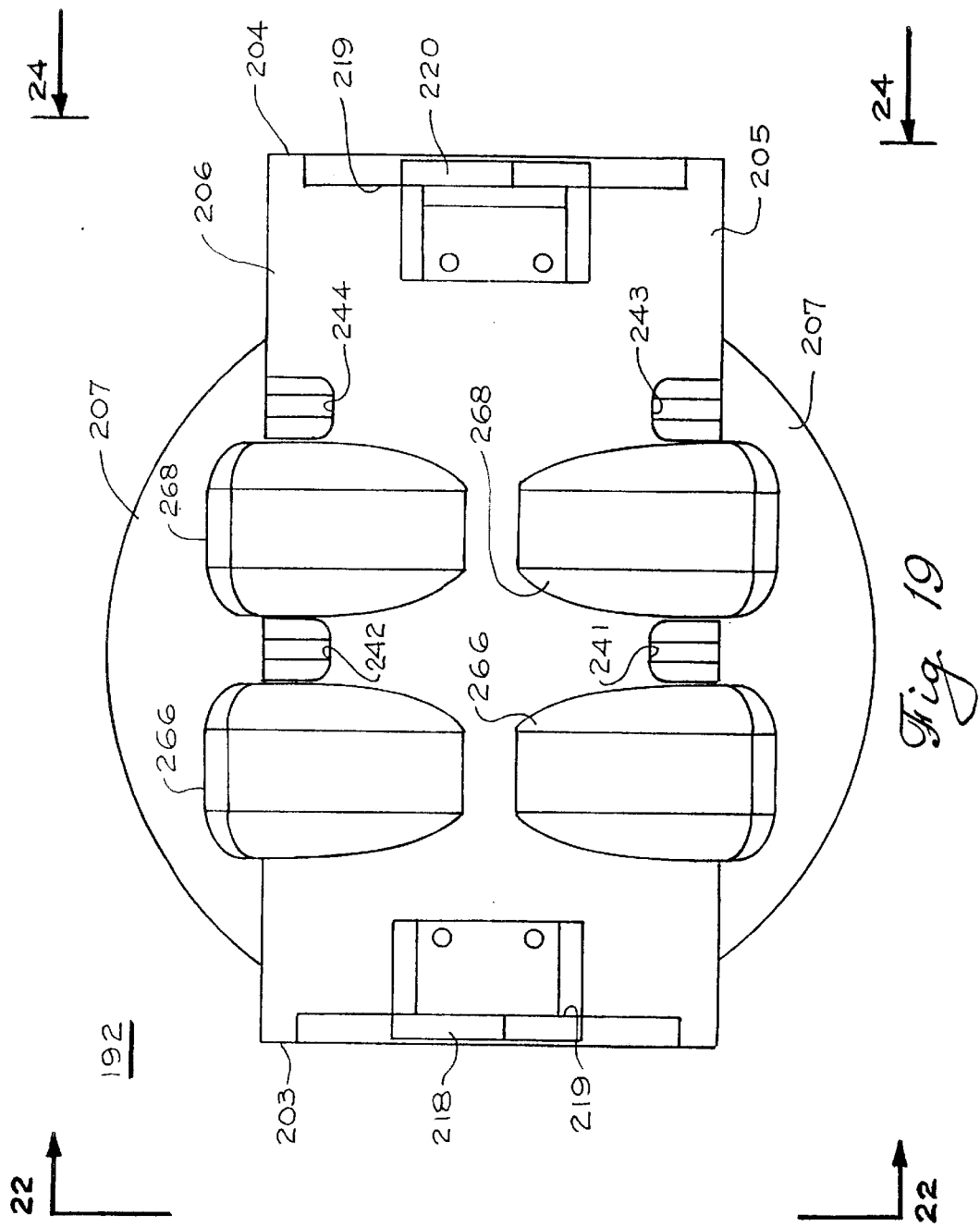
FIG. 19 is a top plan view of the control valve of FIG. 17.
Figure 20:
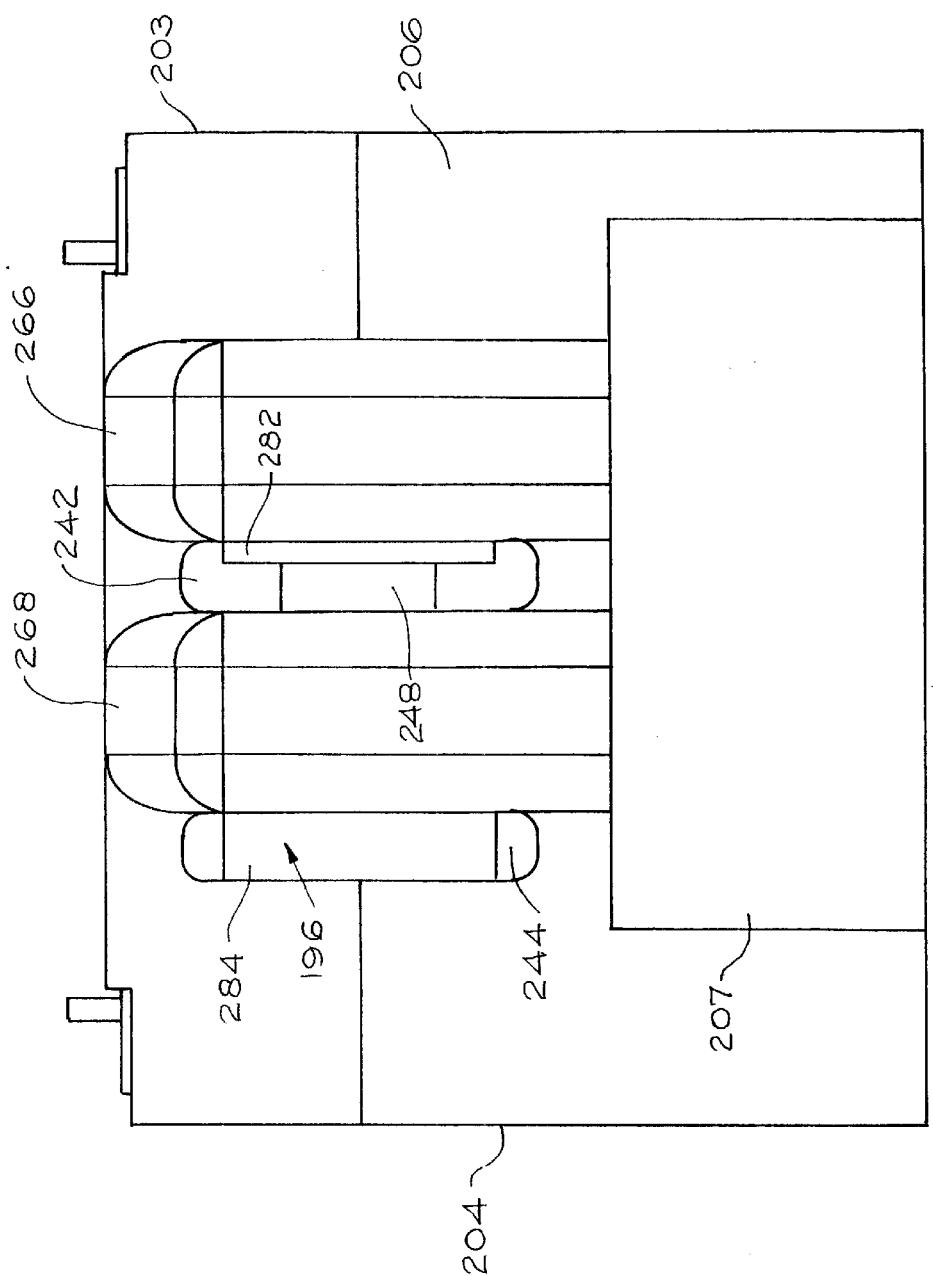
FIG. 20 is a side view of the control valve taken generally along the line 20—20 of FIG. 19.
Figure 21:
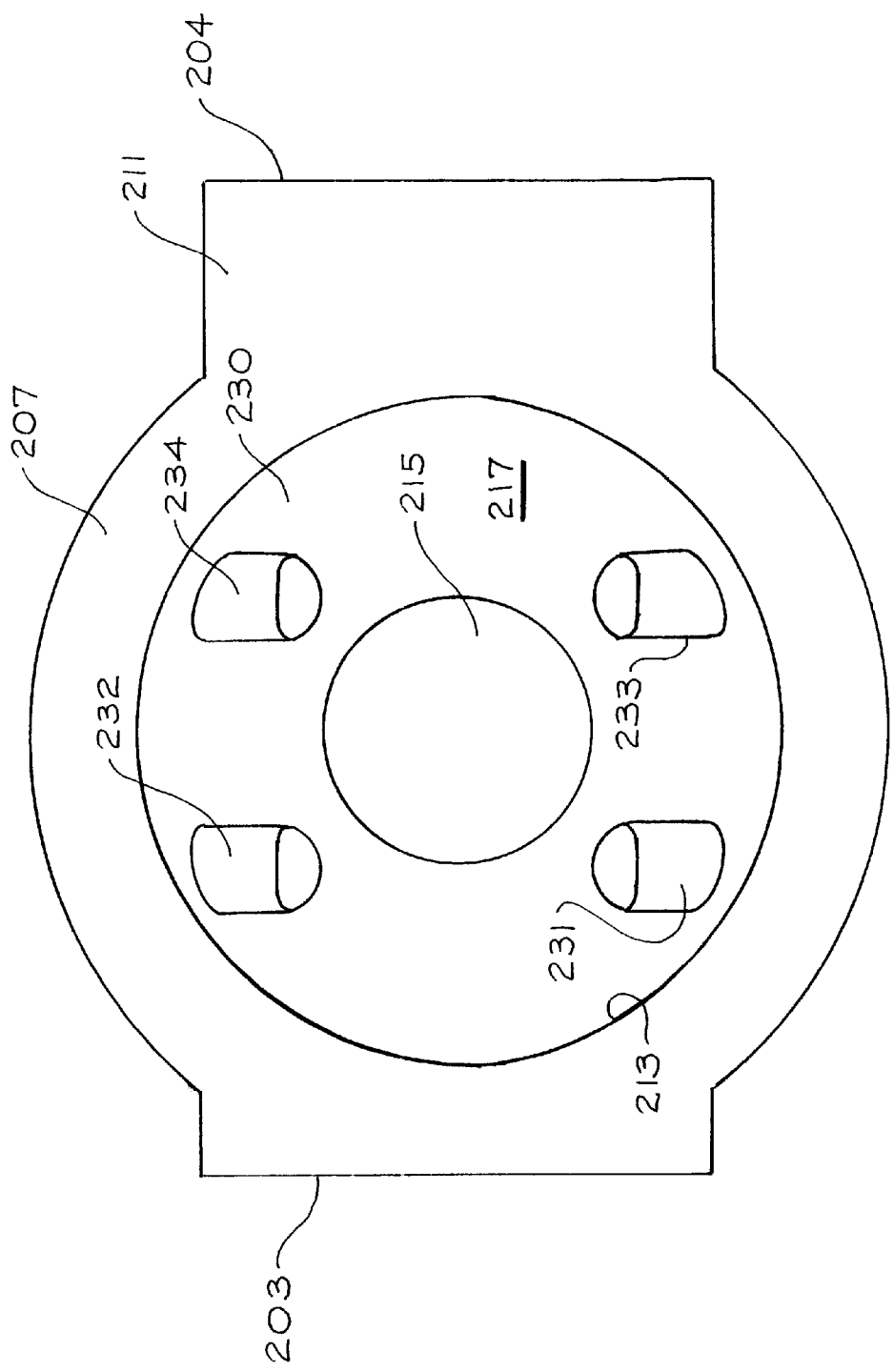
FIG. 21 is a bottom view of the control valve of FIG. 17.
Figure 22:
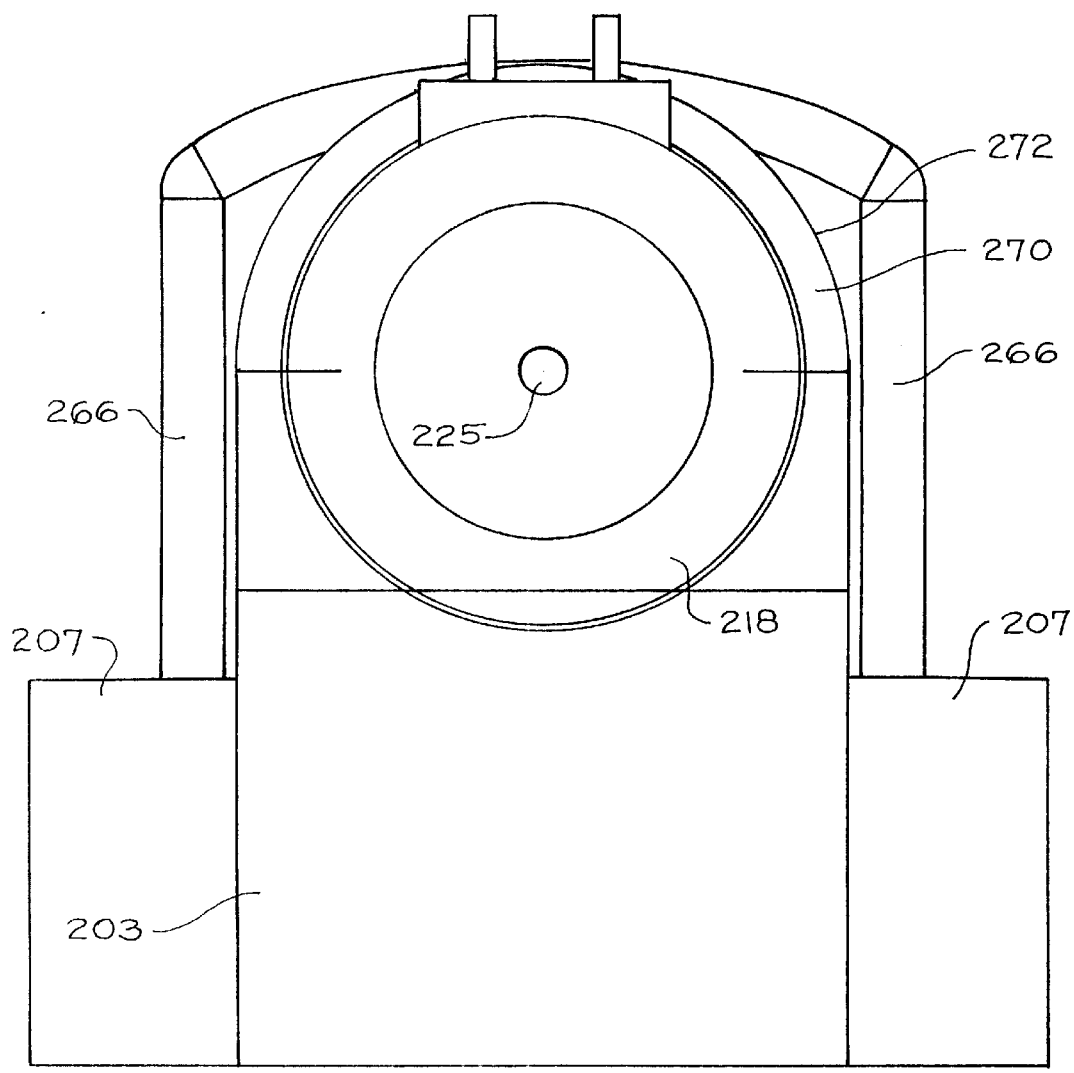
FIG. 22 is a an end view of the control valve of FIG. 17 taken generally along the line 22—22 of FIG. 19.

Referring now to FIGS. 17, 19 and 20, the control valve 192 has four outlet ports 241–244. Two of the valve outlet ports 241 and 243 are formed in one side 205 of the valve casing. The other two valve outlet ports 242 are 244 formed in the opposite side 206 of the valve casing. The valve outlet ports are slots which are generally oval in shape. The valve outlet ports provide openings through the valve between the sides 205 and 206, as shown in FIG. 20, for example. The axes of the valve outlet ports 241–244 extend generally normal to the plane of the valve inlet ports 232–235 and normal to the plane of the axis of the valve spool.

Referring to FIGS. 17, 23 and 24, each of the end walls 203 and 204 of the valve casing 194 is generally rectangular in shape, but includes an arcuate upper portion 270 which merges with the semi-cylindrical upper portion 272 of the valve casing. The end walls 203 and 204 are counterbored defining respective recesses 210 and 212 therein for locating a pair of solenoid windings 214 and 216. The control valve 192 includes cover plates 218 and 220 which are mounted in respective recesses 210 and 212 to enclose the outer sides of the solenoid windings. In one embodiment, the cover plates are fine blanked washers which have flat planar surfaces 219 which are engaged by the valve spool in operation of the control valve. The cover plates 218 and 220 can be substantially flush with the outer surfaces of the end walls 203 and 204 of the valve casing. Each of the cover plates 218 and 220 has a vent opening 225 formed therethrough which is in fluid communication with the interior of the valve 192 for venting to atmosphere, or some other common pressure, any fluid under pressure that leaks past land portions of the valve spool. The cover plates 218 and 220 can be held in place in any suitable manner, such as by an interference fit, or by machine screws, for example.

The top of the valve casing 194 has an opening 279 near each end 203 and 204 to facilitate connection to the electrical leads 224 of the solenoid windings 214 and 216. In one embodiment, pins 225 are molded into arcuate blocks 226 which are adapted to close the openings 279. The pins 225 are adapted for connection to a printed circuit board 227, shown in phantom in FIG. 23, which carries electronic control circuits for the control valve.

Referring to FIGS. 23 and 24, the valve spool 196 is generally cylindrical in shape and includes portions 248 of reduced diameter along its axial extent, defining annular spool lands 281, 282, 283, and 284. The spool lands 281, 282, 283, and 284 are disposed to cooperate with annular valve body lands 291, 292, 293, 294 and 295 which are defined on the inner surface of the valve casing, and which extend along the sides of the bore 208. The inlet ports 232–235 of the control valve communicate with the outlet ports 241–245 of the control valve via the reduced diameter portions 248 of the valve spool whenever the valve spool 196 is moved away from its flow preventing position. This allows high pressure fluid supplied to the valve inlet 230 to flow through the reduced diameter portions 248 from the valve inlet ports 232–235 to the valve outlet ports 241–245 when the valve spool is moved away from the flow preventing position. The control valve is shown in its flow preventing condition in FIG. 23 with one end 196a of the valve spool engaging cover plate 218 and the other end 196b of the valve spool spaced from the cover plate 220, defining a gap 197 therebetween. When operated to the flow permitting condition, the valve spool 196 is moved away from end 196a in the direction of the arrow 290 to engage the cover plate 220 mounted on the end wall 204. In one embodiment, residual magnetism between the part of the valve spool 196 and the cover plate 218 (or 220) maintains the valve spool in a position to which it has been driven.

The pressure chamber 236 is formed to intersect the body lands 291 and 292 and the pressure chamber 237 is formed to intersect the body lands 293 and 294. The valve outlet ports 242 and 243 are formed to intersect the body lands 294 and 295. The valve outlet ports 244 and 245 are formed to intersect the body lands 296 and 297.

Referring now to FIGS. 23–26, when the control valve is in its flow preventing condition, the spool lands 282, 283 and 284 engage body lands 292, 293 and 294, respectively, so that the pressure chambers 236 and 237 are maintained out of communication with the valve outlet ports 242–245.

However, when the control valve is operated to its flow permitting condition, the valve spool 196 is moved to a position such that spool lands 282, 283 and 284 are moved out of engagement with the body lands 292, 293 and 294, respectively, so that the pressure chambers 236 and 237 are communicated with the valve outlet ports 242–245. For such condition, a first portion of the high pressure fluid supplied to the valve inlet 230 of the control valve 192 flows into pressure chamber 236 and a second portion of the fluid flows into pressure chamber 237. The high pressure fluid flowing into pressure chamber 236 is directed over the body land 292 along a flow path represented by the arrow 261 and flows out of the control valve through valve outlets 142 and 143. The high pressure fluid flowing into pressure chamber 237 is directed over body lands 293 and 294 along separate flow paths represented by arrows 262 and 263. This high pressure fluid flows out of the valve through valve outlet ports 144 and 145. The size of the valve outlet ports is selected such that the flow path through the control valve does not restrict the flow into the control valve from the canister.

The longitudinal axis of valve spool 196 is oriented transversely to the direction of fluid flow through the control valve. Thus, the valve spool 196, when actuated, moves in a direction which is substantially normal to the direction of fluid flow through the control valve. The operation of the control valve 192 provided by the invention is substantially independent of forces produced by flow of the high pressure fluid that is being introduced into the control valve.

As has been illustrated above, the outlet ports 242, 244 and 243 and 245 are located on opposite sides 205 and 206 of the control valve casing. Because the outlet ports are disposed normal to the inlet ports, and are provided at opposite sides of the control valve, the high pressure fluid introduced into the inflatable restraint 24 (FIG. 1) directed along flow paths that extend substantially normal to a major axis of the inflatable restraint Moreover, this is achieved without the need for an outlet member. This provides automatic diffusion for the high pressure fluid as it is being introduced into the inflatable restraint.

Referring to FIGS. 23 and 24, the interior of the valve spool 196 is vented to a common pressure, which can be atmospheric pressure, or some other common pressure. To this end, vent holes 225 are provided in the cover plates 218 and 220 at the top and bottom of the control valve casing 194. This allows substantially equal pressures to be provided at opposite ends of the valve spool. Maintaining substantially equal pressures at opposite end of the valve spool assures fast operation of the valve spool during dynamic operation of the control valve.

Figure 27:
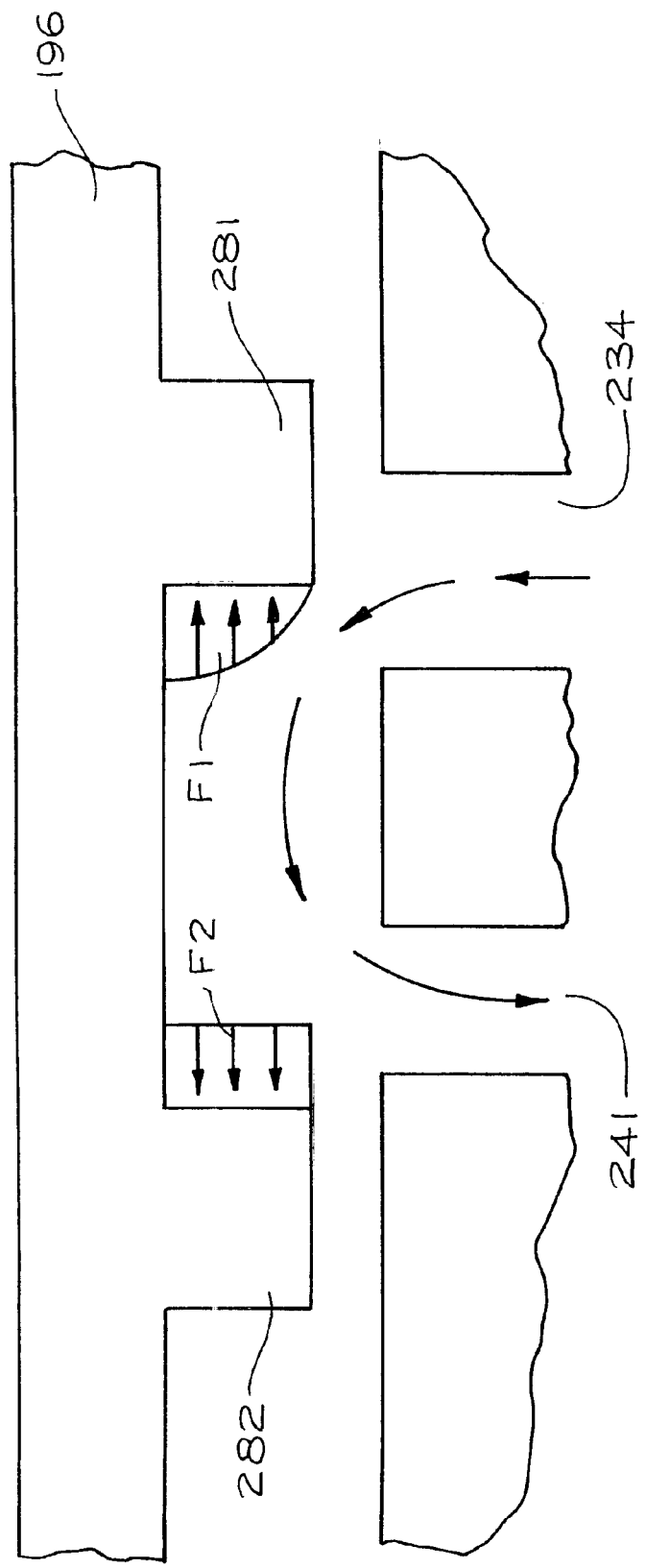
FIG. 27 is a simplified representation of metering lands a portion of a control valve showing fluid gradient on pressure as the result of pressurized fluid flow through the control valve.

Referring to FIG. 27, when the valve spool 196 is in its open position, allowing fluid flow through the valve, the velocity of the fluid causes a pressure gradient on the metering lands 281 and 282. This pressure gradually causes a net force (F2-F1) on the valve spool which tends to move the spool to its closed position. This condition is based on mass flow which in a gas system is substantially less than typical hydraulic control valves. Consequently, complete compensation, such as by complex spool geometry, may not be necessary.

Figure 28:
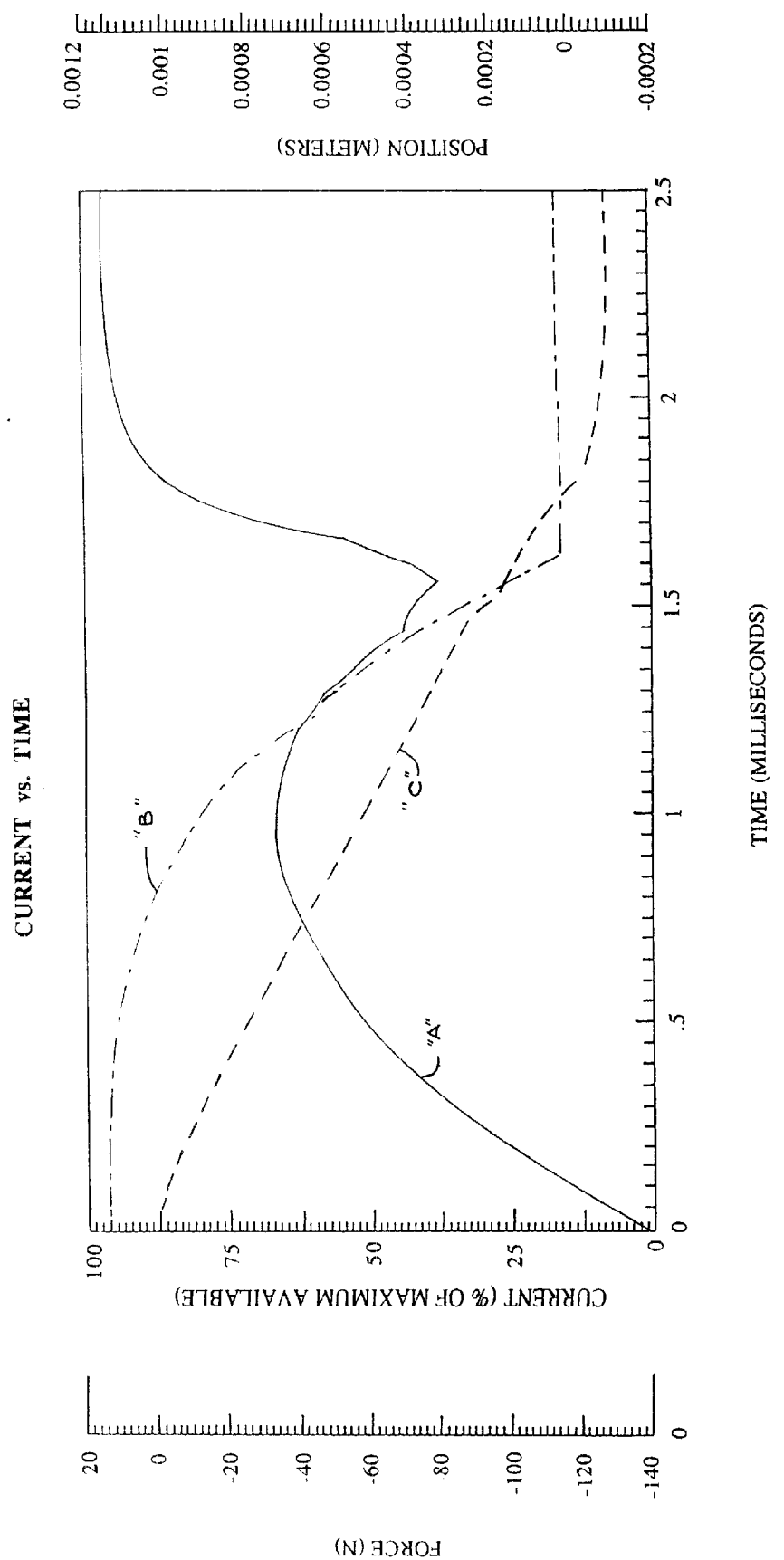
FIG. 28 is a graph generally illustrating solenoid current and the position of the valve spool as a function of time.

FIG. 28 is a graph illustrating solenoid current "I" and the position of the valve spool as a function of time "T" for the control valves 92 (FIGS. 8–16) and 192 (FIGS. 17–25). The solenoid winding is energized by a step input, such as a ten volt pulse. Curve "A" represents current "I", in amperes, as a function of time "T", in seconds. The elapsed time is about 1.3 to 1.6 milliseconds. The inductance of the winding changes as the valve spool 96 (or 196) is moved away from end cover 120 (or 220) toward end cover 118 (or 218). The current "I" increases to about 70% of the maximum value after about 1 millisecond. During this time, there is minimal movement of the valve spool 96 (or 196). When the valve spool 96 (or 196) begins to move, after about 1 millisecond, the current begins to decrease slightly, reaching a decreased level creating a cusp in the curve. When the valve spool 96 reaches the end of travel after about 1.6 milliseconds, and stops, the current begins to increase rapidly toward about 100% available current based on coil resistance.

Curve "B" is a representation of position of the valve spool 96 (or 196) as a function of time "T" in seconds, during energization of the solenoid winding. In one embodiment, the gap 97 (or 197) between the upper end of the valve spool 96 (or 196) and the end cover 118 (or 220) is about 0.0016 meters. Thus, initially the valve spool 96 (or 196) starts at a position about 0.0016 meters from the end cover 118 (or 220) and reaches the end of travel after about 1.6 milliseconds. Although not illustrated in FIG. 29 at the time of activating solenoid 34 for example, to move the valve spool from its closed IQ open position,. a negative pulse of a short duration can be applied to the other solenoid, such as solenoid 36, to assist in canceling residual magnetism between the end of the valve spool and the cover plate.

Figure 29:
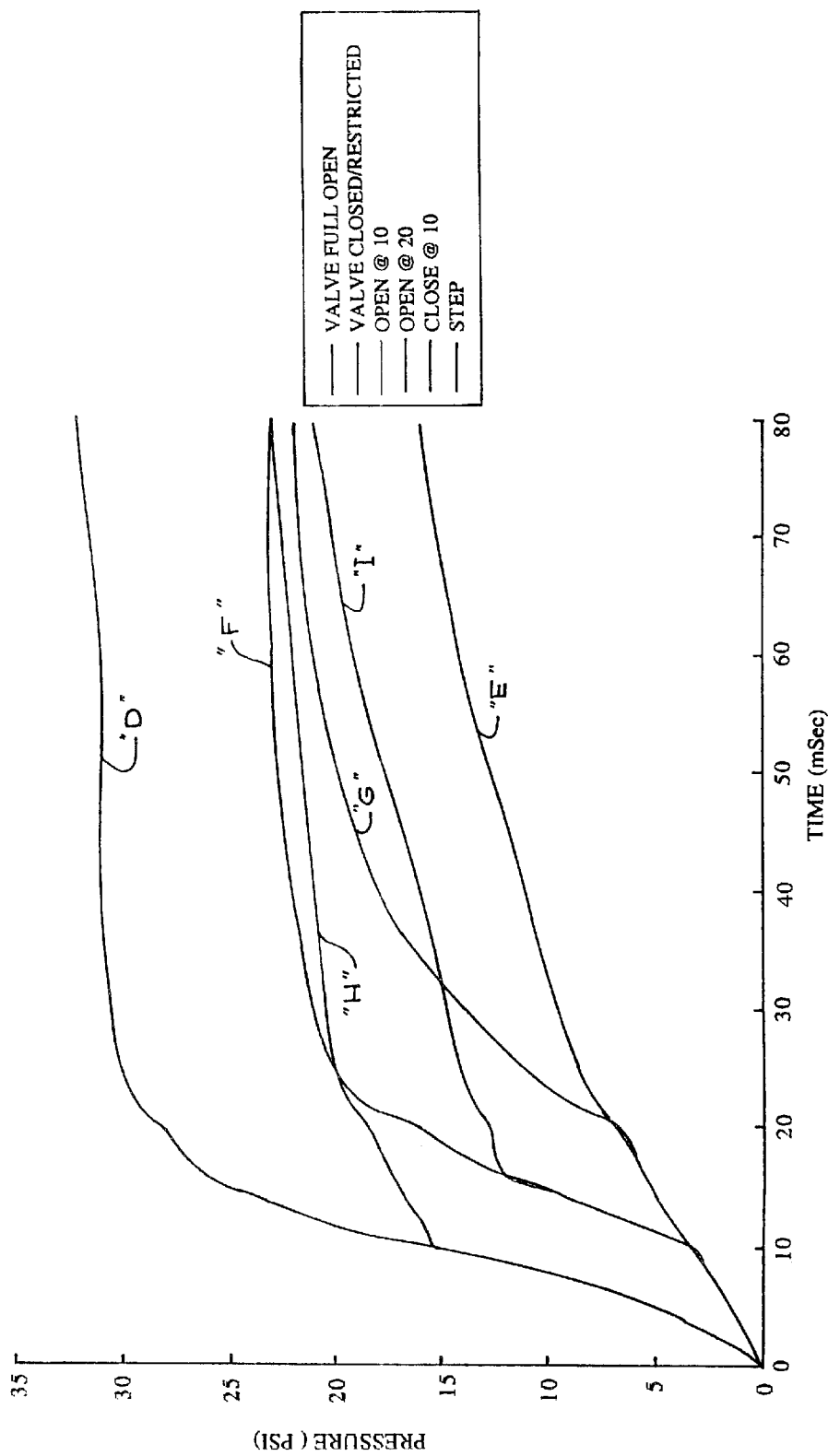
FIG. 29 is a graph of pressure versus time for various exemplary airbag inflation rates for the control valve provided by the invention.

Curve "C" is a representation of solenoid force "T" as a function of time "T". The force decreases generally linearly for about for about 1.8 milliseconds. Referring now to FIG. 29, there is illustrated a pressure "P" versus time "T" graph for airbag inflation for the control valve provided by the invention. Different selected inflation rates are represented by curves D, E, F, G, H and I. One inflation rate, represented by curve "D" is provided for a "full open" condition for the condition the control valve 92 and 192. This condition provides the speed and force to restrain an average or above average size adult. When the tank pressure is restricted, a slower inflation rate, represented by curve "E" is provided. This inflation rate is suitable for venting the airbag system in the case of accidental deployment. In addition, the inflation characteristics, represented by curves "F", "G", "H", and "I", represent intermediate inflation rates and are provided for conditions that warrant inflation rates between the upper and lower limit rates. Curves "F" and "G" represent the inflation rate when the opening of the control valve is delayed 10 milliseconds and 20 milliseconds, respectively, after the onset of the inflation initiation cycle. Curve "H" represents the inflation rate when the control valve is opened at the onset of the inflation initiation cycle and then closed after 10 milliseconds. Curve "I" represents the inflation rate for multiple changes in the control valve rate, such a delayed opening at 10 milliseconds, closing at about 18 milliseconds and reopening at about 20 milliseconds. According to the invention, all of these response characteristics, as well as many others, can be obtained using a single control valve. That is, virtually any response characteristic can be provided by the dynamic control system of the present invention. This is achieved by modulating the drive signals for the valve solenoids and/or by between the two valve solenoids, providing for controlled opening and closing of the control valve as the inflatable restraint filling process proceeds.

Figure 30:
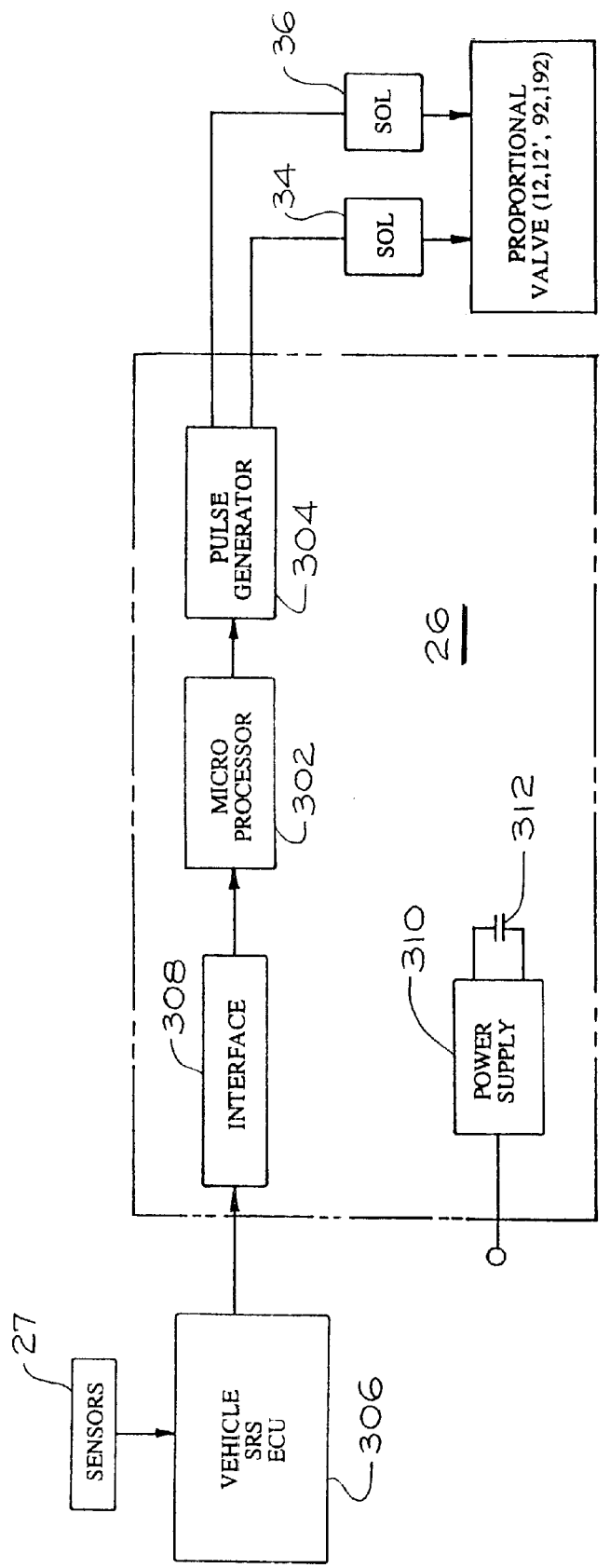
FIG. 30 is a block diagram of the controller of the dynamic control valve system of the present invention.

FIG. 30 is a block diagram of the controller 26 for controlling the operation of the control valves 12, 12', 92, and 192 of the dynamic valve control system 10. The controller provides first and second modulated drive signals for the first and second valve solenoids 34 and 36, respectively, for varying the flow rate through the control valve. Sensors 27 can be located on the vehicle for sensing one or more vehicle parameters (such as vehicle deceleration and/or vehicle acceleration) and one or more occupant parameters (such as presence, size and/or weight of a driver and/or passenger).

The controller 26 includes a microprocessor 302 which receives input signals from the electric control unit 306 associated with the vehicle SRS system or the vehicle computer. The controller 36 processes the input signals and controls a pulse generator 304 to provide the appropriate (hive signals for the solenoids 34 and 36 of the control valve (12, 12', 92 or 192). The controller 26 may include an interface circuit 308 interposed between the vehicle SRS system or computer and the microprocessor 302.

The pulse generator provides current pulses at a level determined by the power supply 310 for the controller. Typically, the power supply 310 receives power from the battery of the vehicle. However, the power supply 310 includes a capacitor 312 which is maintained charged. The capacitor 312 provides back-up power for use in activating the control valve to a predetermined fail safe position if vehicle battery power or control signal from vehicle SRS system is lost during a collision.

We claim:

1. A dynamic control valve system adapted for controlling the inflation of an inflatable restraint of an inflatable restraint systems for vehicles, the dynamic control valve system comprising:

a container at least temporarily containing a fluid under high pressure;

a control valve having a valve inlet in fluid communication with the container and a valve outlet in fluid communication with an inlet of the inflatable restraint, the control valve including a valve member actuatable between at least a first position in which the control valve is substantially closed and a second position in which the control valve is substantially open;

the control valve arranged to communicate the high pressure fluid through the control valve to the inflatable restraint inflating the inflatable restraint when the valve member is actuated between the first and second positions, and the control valve being constructed and arranged so that actuation of the valve member between the first and second positions is substantially independent of forces produced by flow of the high pressure fluid through the valve, and so that the valve member, when unactuated, is maintained in the first position without mechanical bias, and the control valve being constructed and arranged to be controlled to allow the flow rate of the high pressure fluid through the control valve from the valve inlet to the valve outlet to be modulated, thereby dynamically varying the rate of inflation of the inflatable restraint.

2. The dynamic control valve system according to claim 1, including a controller coupled to the control valve for electrically operating the control valve for actuating the valve member between the first and second positions based upon at least one parameter from the group consisting of a vehicle parameter and an occupant parameter.

3. The dynamic control valve system according to claim 2, wherein the vehicle parameter includes at least one of vehicle deceleration and vehicle acceleration, and wherein the occupant parameter includes at least one of presence of an occupant, position of an occupant, size of an occupant and weight of an occupant.

4. The dynamic control valve system according to claim 1, wherein the valve member of the control valve comprises a generally cylindrical valve spool, and wherein the valve spool includes a plurality of metering lands and a plurality of exhaust lands.

5. The dynamic control valve system according to claim 4, further including a valve body having a generally cylindrical bore, and wherein the valve spool is located in the bore for axial movement, the valve spool including a substantially circular section and grooves in the circular section of the valve spool for communicating the valve inlet with the valve outlet when the valve spool is moved towards its second position, and wherein the high pressure fluid flows through the grooves in the circular section of the control valve when the valve spool is moved toward its second position.

6. The dynamic control valve system according to claim 5, wherein the valve inlet includes at least first and second valve inlet ports formed in the valve body, said inlet ports arranged to cause the high pressure fluid to be introduced into the control valve at diametrically opposed locations, and wherein the valve outlet includes at least first and second valve outlet ports disposed in the valve body to cause the high pressure fluid to flow out of the control valve at diametrically opposed locations.

7. The dynamic control valve system according to claim 6, wherein the inlet ports are defined by inlet bores formed through a sidewall of the valve body to intersect the metering lands, and wherein the valve outlet ports are defined by outlet bores formed through a sidewall of the valve body to intersect the metering lands.

8. The dynamic control valve system according to claim 1, wherein the control valve member defines at least one fluid leakage path, said leakage path arranged to allow a predetermined volume of the high pressure fluid to leak through the control valve upon actuation of the control valve, to thereby control the rate of inflation of the inflatable restraint.

9. A dynamic control valve system adapted for controlling the inflation of an inflatable restraint of an inflatable restraint system for vehicles, the dynamic control valve system comprising:

a container at least temporarily containing a fluid under high pressure;

a control valve having a valve inlet in fluid communication with an outlet of the container and a valve outlet in fluid communication with an inlet of the inflatable restraint, the control valve including a valve member moving between at least a first position in which the control valve is substantially closed and a second position in which the control valve is substantially open; and a controller coupled to the control valve actuating the control valve based upon at least one of vehicle parameter and occupant parameter;

the control valve arranged to communicate the high pressure fluid to the inflatable restraint inflating the inflatable restraint with the high pressure fluid when the valve member is moved between the first and second positions, and the control valve being constructed and arranged to be controlled by the controller to allow the flow rate of the high pressure fluid through the control valve from the valve inlet to the valve outlet to be modulated, thereby dynamically varying the rate of inflation of the inflatable restraint as a function of said at least one parameter from the group consisting of a vehicle parameter and an occupant parameter.

10. The dynamic control valve system according to claim 9, wherein vehicle parameter includes at least one of, vehicle deceleration and vehicle acceleration, and wherein the occupant parameter includes at least one of presence of an occupant, position of an occupant, size of an occupant, and a weight of an occupant.

11. The dynamic control valve system according to claim 9, wherein the control valve includes a first solenoid operable for moving its valve member toward the first position and a second solenoid operable for moving its valve member toward the second position.

12. The dynamic control valve system according to claim 11, wherein the controller provides drive signals for driving the first solenoid independently of the second solenoid for varying the rate of flow of the high pressure fluid through the control valve during the inflation of the inflatable restraint.

13. The dynamic control valve system according to claim 11, wherein the controller provides first and second modulated drive signals for the first and second solenoids, respectively, for varying the flow rate of high pressure fluid through the control valve.

14. The dynamic control valve system according to claim 10, further including at least one sensing device coupled to an input of the controller for supplying to the controller an input based upon at least one of occupant parameters.

15. The dynamic control valve system according to claim 9, wherein the control valve includes a bias structure for biasing the valve member toward its first position, and a solenoid operable for moving the valve member, against the force of the bias structure, toward the second position.

16. The dynamic control valve system according to claim 9, wherein the inflatable restraint includes a major axis and the container is arranged to communicate the high pressure fluid into the inflatable restraint along at least one flow path that extends substantially normal to the major axis of the inflatable restraint.

17. The dynamic control valve system according to claim 9, wherein the high pressure fluid flows through the control valve along at least one fluid flow axis, and wherein the high pressure fluid is directed into the inflatable restraint along at least one flow path that extends at approximately ninety degrees relative to said one fluid flow axis of the control valve.

* * * * *